United States Patent
Amini et al.

(10) Patent No.: US 10,827,323 B2
(45) Date of Patent: Nov. 3, 2020

(54) MACHINE LEARNING COORDINATED WIRELESS NETWORKING

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 15/464,135

(22) Filed: Mar. 20, 2017

(65) Prior Publication Data

US 2018/0103408 A1 Apr. 12, 2018

Related U.S. Application Data

(60) Provisional application No. 62/406,325, filed on Oct. 10, 2016.

(51) Int. Cl.
*H04W 4/30* (2018.01)
*H04W 36/16* (2009.01)
(Continued)

(52) U.S. Cl.
CPC ............ *H04W 4/30* (2018.02); *G01S 5/0289* (2013.01); *G01S 5/0294* (2013.01); *G01S 19/46* (2013.01); *G08B 13/2494* (2013.01); *H04B 1/005* (2013.01); *H04B 1/713* (2013.01); *H04B 17/0085* (2013.01); *H04B 17/318* (2015.01); *H04B 17/345* (2015.01); *H04L 5/003* (2013.01); *H04L 12/4633* (2013.01); *H04L 41/12* (2013.01); *H04L 43/08* (2013.01); *H04L 43/0864* (2013.01); *H04L 43/0888* (2013.01);
(Continued)

(58) Field of Classification Search
None
See application file for complete search history.

(56) References Cited

U.S. PATENT DOCUMENTS 7,248,574 B2 7/2007 Backes et al.
9,179,495 B1 11/2015 Scherzer et al.
(Continued)

FOREIGN PATENT DOCUMENTS

CN 1582009 A 2/2005
CN 1770912 A 5/2006
(Continued)

*Primary Examiner* — Gregory B Sefcheck
*Assistant Examiner* — Amarnauth G Persaud
(74) *Attorney, Agent, or Firm* — Perkins Coie LLP; Colin Fowler

(57) ABSTRACT

The disclosed methods and systems use artificial intelligence (AI) and machine learning (ML) technologies to model the usage and interference on each channel. For example, units of the system can measure channel interference regularly over the time of day on all radios. The interference information is communicated to the base unit or a cloud server for pattern analysis. Interference measurements include interference from units within the system as well as interference from nearby devices. The base unit or the cloud server can recognize the pattern of the interference. Further, connected devices have a number of network usage characteristics observed and modeled including bitrate, and network behavior. These characteristics are used to assign channels to connected devices.

15 Claims, 29 Drawing Sheets

(51) Int. Cl.

| | | |
|---|---|---|
| *H04W 72/04* | (2009.01) | |
| *H04W 4/02* | (2018.01) | |
| *H04W 4/029* | (2018.01) | |
| *H04W 76/11* | (2018.01) | |
| *H04W 16/26* | (2009.01) | |
| *G08B 13/24* | (2006.01) | |
| *H04L 12/26* | (2006.01) | |
| *H04L 12/24* | (2006.01) | |
| *H04W 12/08* | (2009.01) | |
| *H04W 36/00* | (2009.01) | |
| *H04W 36/36* | (2009.01) | |
| *H04B 17/318* | (2015.01) | |
| *H04W 28/02* | (2009.01) | |
| *H04W 84/12* | (2009.01) | |
| *H04L 29/08* | (2006.01) | |
| *H04W 36/24* | (2009.01) | |
| *H04W 36/32* | (2009.01) | |
| *H04W 36/38* | (2009.01) | |
| *H04W 4/70* | (2018.01) | |
| *H04W 4/80* | (2018.01) | |
| *H04L 12/46* | (2006.01) | |
| *H04B 1/00* | (2006.01) | |
| *H04B 1/713* | (2011.01) | |
| *H04L 5/00* | (2006.01) | |
| *H04W 80/06* | (2009.01) | |
| *H04W 84/04* | (2009.01) | |
| *H04W 84/10* | (2009.01) | |
| *H04B 17/345* | (2015.01) | |
| *H04B 17/00* | (2015.01) | |
| *G01S 5/02* | (2010.01) | |
| *G01S 19/46* | (2010.01) | |
| *H04W 36/20* | (2009.01) | |
| *H04W 72/08* | (2009.01) | |
| *H04W 28/04* | (2009.01) | |
| *H04W 84/18* | (2009.01) | |
| *H04W 48/02* | (2009.01) | |
| *H04W 76/15* | (2018.01) | |
| *H04W 12/00* | (2009.01) | |
| *H04L 12/751* | (2013.01) | |
| *H04W 88/08* | (2009.01) | |
| *H04W 88/10* | (2009.01) | |
| *H04W 92/20* | (2009.01) | |
| *H04B 1/715* | (2011.01) | |
| *H04W 40/24* | (2009.01) | |
| *H04W 8/00* | (2009.01) | |
| *H04W 28/18* | (2009.01) | |
| *H04W 72/12* | (2009.01) | |

(52) U.S. Cl.
CPC ............ *H04L 43/16* (2013.01); *H04L 67/303* (2013.01); *H04W 4/02* (2013.01); *H04W 4/029* (2018.02); *H04W 4/70* (2018.02); *H04W 4/80* (2018.02); *H04W 12/08* (2013.01); *H04W 16/26* (2013.01); *H04W 28/0236* (2013.01); *H04W 28/0289* (2013.01); *H04W 28/04* (2013.01); *H04W 36/0055* (2013.01); *H04W 36/0072* (2013.01); *H04W 36/0083* (2013.01); *H04W 36/0094* (2013.01); *H04W 36/16* (2013.01); *H04W 36/20* (2013.01); *H04W 36/245* (2013.01); *H04W 36/32* (2013.01); *H04W 36/36* (2013.01); *H04W 36/38* (2013.01); *H04W 72/0453* (2013.01); *H04W 72/082* (2013.01); *H04W 76/11* (2018.02); *H04W 80/06* (2013.01); *H04W 84/045* (2013.01); *H04W 84/105* (2013.01); *H04W 84/12* (2013.01); *H04B 2001/7154* (2013.01); *H04L 45/02* (2013.01); *H04W 4/023* (2013.01); *H04W 8/005* (2013.01); *H04W 12/00502* (2019.01); *H04W 12/00503* (2019.01); *H04W 28/18* (2013.01); *H04W 40/246* (2013.01); *H04W 48/02* (2013.01); *H04W 72/1231* (2013.01); *H04W 76/15* (2018.02); *H04W 84/18* (2013.01); *H04W 88/08* (2013.01); *H04W 88/10* (2013.01); *H04W 92/20* (2013.01)

(56) References Cited

U.S. PATENT DOCUMENTS

| | | |
|---|---|---|
| 9,554,061 B1 | 1/2017 | Proctor et al. |
| 9,990,822 B2 | 6/2018 | Emmanuel et al. |
| 2007/0142050 A1 | 6/2007 | Handforth et al. |
| 2010/0267414 A1 | 10/2010 | Backes et al. |
| 2013/0308470 A1 | 11/2013 | Bevan et al. |
| 2013/0331098 A1* | 12/2013 | Balasubramaniyan ...................... H04W 4/029 455/434 |
| 2014/0098682 A1 | 4/2014 | Cao et al. |
| 2014/0105135 A1 | 4/2014 | Tellado et al. |
| 2014/0269526 A1 | 9/2014 | Mitola et al. |
| 2015/0004974 A1 | 1/2015 | Karimi-Cherkandi et al. |
| 2015/0038140 A1* | 2/2015 | Kilpatrick, II ........ H04W 64/00 455/436 |
| 2015/0071163 A1 | 3/2015 | Mackie |
| 2015/0133124 A1* | 5/2015 | Lim ...................... H04W 36/04 455/436 |
| 2015/0195776 A1 | 7/2015 | Padden et al. |
| 2015/0244580 A1 | 8/2015 | Saavedra |
| 2015/0350228 A1 | 12/2015 | Baxley et al. |
| 2016/0135204 A1* | 5/2016 | Mishra ................. H04W 72/085 370/332 |
| 2016/0242183 A1 | 8/2016 | Kang et al. |
| 2016/0255550 A1* | 9/2016 | Narita .................... H04W 36/36 455/67.11 |
| 2016/0345192 A1 | 11/2016 | Garg et al. |
| 2016/0353351 A1* | 12/2016 | Huber ................. G06Q 20/1235 |
| 2017/0094681 A1 | 3/2017 | Takeda et al. |
| 2017/0164323 A1 | 6/2017 | Markhovsky et al. |
| 2017/0164375 A1 | 6/2017 | Sundararajan et al. |
| 2017/0169597 A1* | 6/2017 | Hoof ........................ G06T 5/009 |
| 2017/0195006 A1 | 7/2017 | Krasner et al. |
| 2017/0347269 A1 | 11/2017 | Wu et al. |
| 2018/0062723 A1 | 3/2018 | Wilhelmsson et al. |
| 2018/0324607 A1 | 11/2018 | Rengarajan et al. |

FOREIGN PATENT DOCUMENTS

| | | |
|---|---|---|
| CN | 1801751 A | 7/2006 |
| CN | 101437234 A | 5/2009 |
| CN | 102084266 A | 6/2011 |
| CN | 103718058 A | 4/2014 |
| CN | 104254114 A | 12/2014 |
| CN | 104412663 A | 3/2015 |
| CN | 104579610 A | 4/2015 |
| WO | 2010105210 A2 | 9/2010 |
| WO | 2015042967 A1 | 4/2015 |
| WO | 2015174437 A1 | 11/2015 |
| WO | 2016050805 A1 | 4/2016 |
| WO | 2016064641 A1 | 4/2016 |
| WO | 2016065368 A1 | 4/2016 |

* cited by examiner

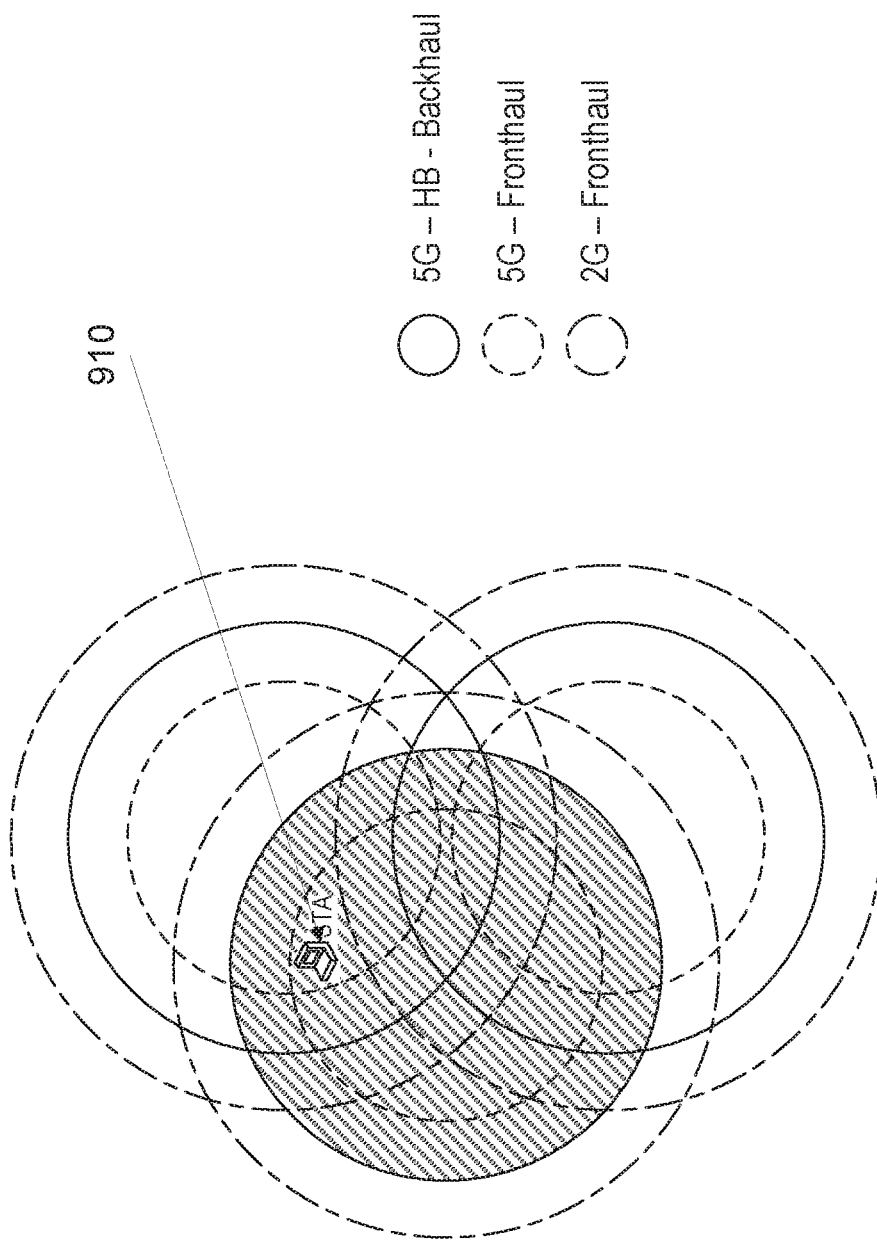

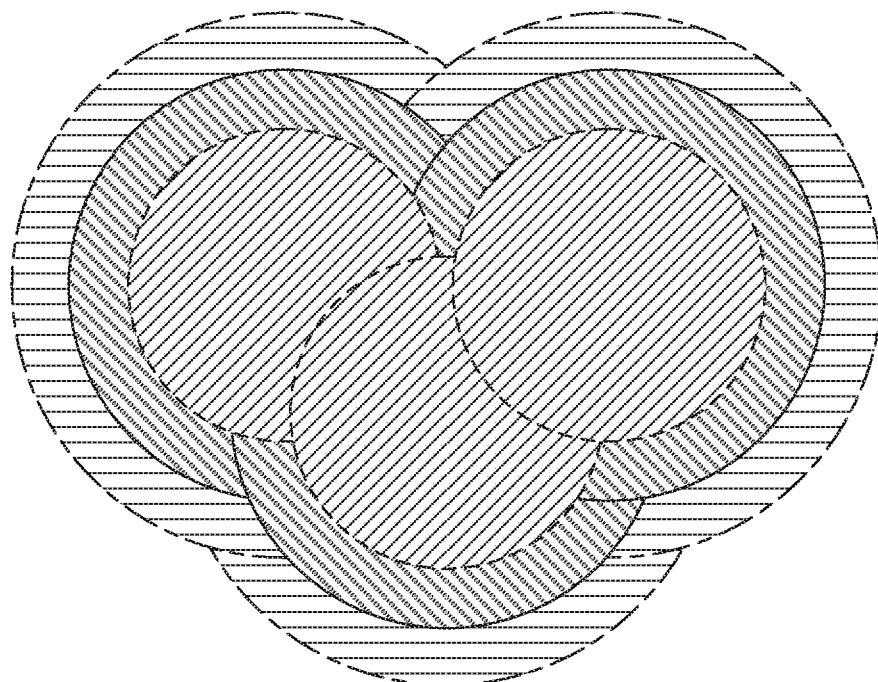
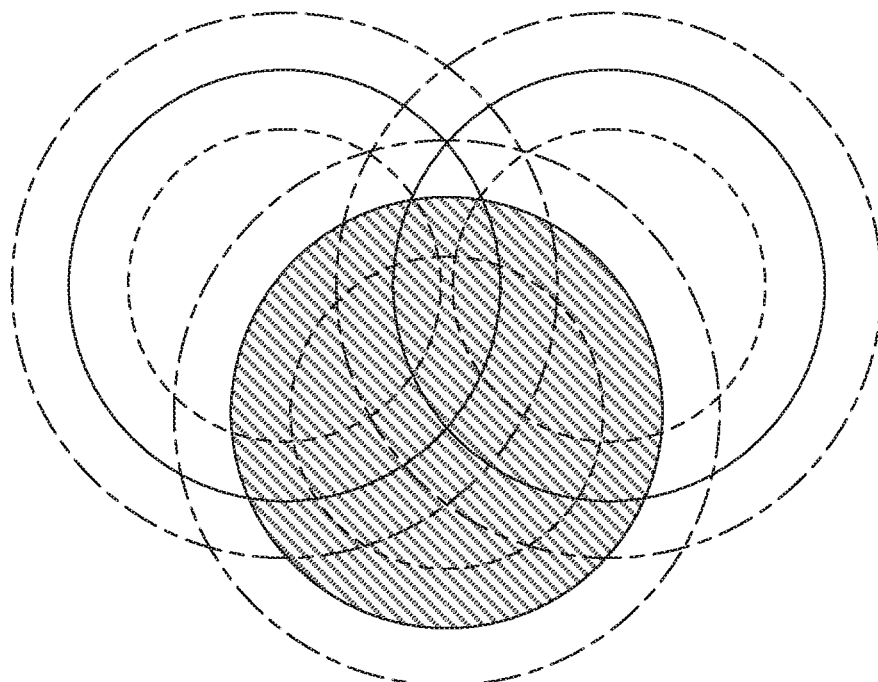
FIG. 8

MACHINE LEARNING COORDINATED WIRELESS NETWORKING

CROSS REFERENCE TO RELATED APPLICATIONS

This application claims priority to U.S. provisional patent application No. 62/406,325, filed Oct. 10, 2016, which application is incorporated herein in its entirety by this reference thereto.

TECHNICAL FIELD

Teachings relate to wireless access points. Teachings more particularly relate to the control of wireless connections between a number of access points and user devices and the channels upon which those connections operate.

BACKGROUND

Devices with strong, clear wireless connections are optimal. There are many issues obstructing this goal. Some examples include limitations of broadcast frequencies, range of wireless network broadcasts, interference from dormant objects (i.e. walls), interference from active objects (i.e. microwaves, TV's), interference from other wireless devices (i.e. access points on other networks, both local and foreign connected devices), and conflicting device configurations. Generally speaking, the effectiveness of the function of an access point or a series of access points (i.e. signal repeaters) is highly dependent on a given user's behavior and the immediate environment of the access point(s). Thus, an access point that takes advantage of this information is useful.

SUMMARY

Introduced here is a multi-band (e.g., Tri-band) wireless networking system. In some embodiments, the multi-band wireless networking system includes multiple wireless networking devices. At least one of the wireless networking devices is connected to the Internet and serves as a router. The remaining wireless networking device(s) serve as satellite(s) that are wirelessly connected to the router via a wireless channel (a band), which is dedicated to the communications between the wireless networking devices. Both the router and the satellites provide wireless network connections (e.g., WiFi connections) to client devices, such as desktop computers, laptop computers, tablet computers, mobile phones, wearable smart devices, game consoles, smart home devices, etc. The router and the satellites provide to the client devices a single wireless network with broad coverage. The multi-band wireless networking system dynamically optimizes the wireless connections of the client devices without the need of reconnecting.

Other aspects of the disclosed embodiments will be apparent from the accompanying figures and detailed description.

This Summary is provided to introduce a selection of concepts in a simplified form that is further explained in the Detailed Description. This Summary is not intended to be used to limit the scope of the claimed subject matter.

BRIEF DESCRIPTION OF THE DRAWINGS

FIG. 7 shows inferences within units of the system on 2 GHz and 5 GHz.

FIG. 8 shows transmit and receive overlapping between the units.

DETAILED DESCRIPTION

Figure 1:
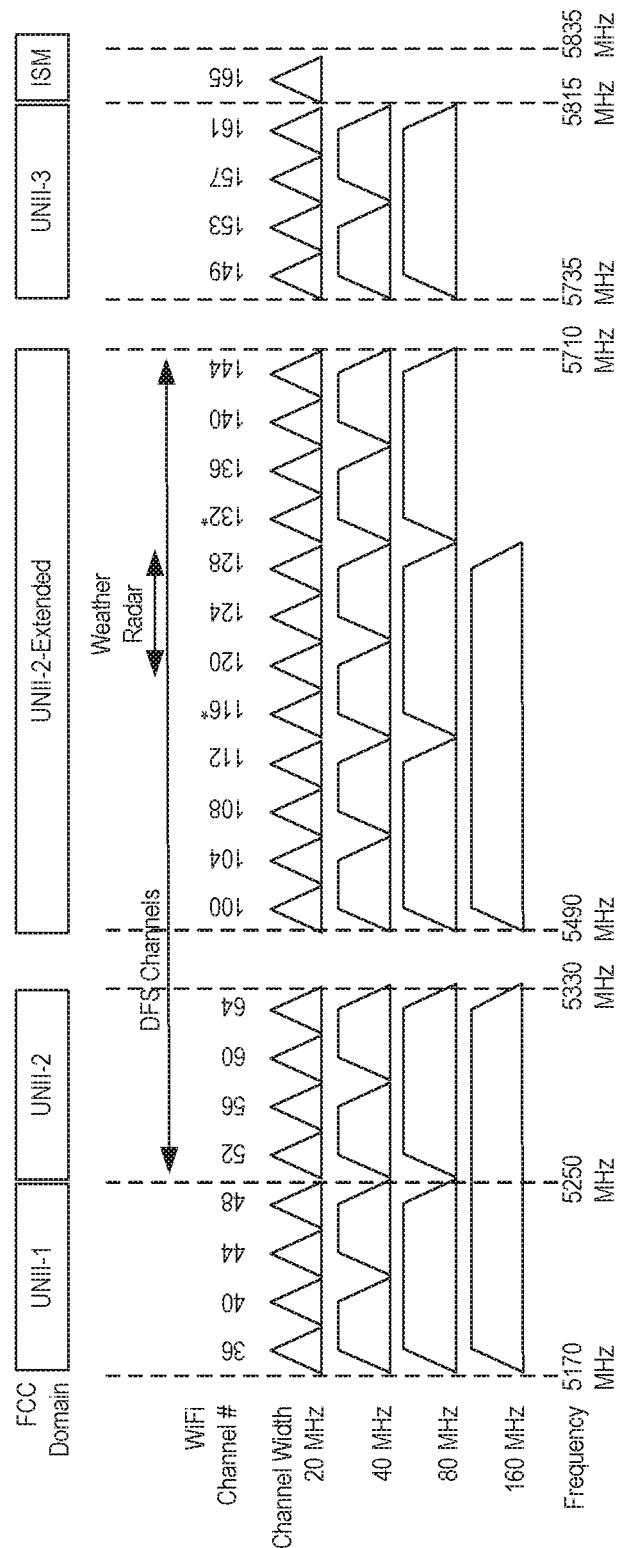
FIG. 1 shows a 5 GHz channel allocation in North America.

The embodiments set forth below represent the necessary information to enable those skilled in the art to practice the embodiments and illustrate the best mode of practicing the embodiments. Upon reading the following description, in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

In this description, references to "an embodiment," "one embodiment," "an implementation," or the like, mean that the particular feature, function, structure or characteristic being described is included in at least one embodiment of the techniques introduced here. Occurrences of such phrases in this specification do not necessarily refer to the same embodiment. On the other hand, the embodiments referred to also are not necessarily mutually exclusive. Additionally, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

Further, the term "cause" and variations thereof refer to either direct causation or indirect causation. For example, a computer system can "cause" an action by sending a message to a second computer system in order to command, request, or prompt the second computer system to perform the action. Any number of intermediary devices may examine and/or relay the message during this process. In this regard, a device can "cause" an action even though it may not be known to the device whether the action will ultimately be executed.

Multi-Band Wireless Networking System

This disclosure frequently refers to a multi-band wireless networking system (also referred to herein as simply "system"). Each of the wireless networking devices (also referred to herein as simply "device" or "unit") of the system has multiple (e.g., three) wireless radio components for wireless communications over multiple (e.g., three) wireless bands. The system can dynamically and automatically select a channel at which the system is wirelessly connected to the client devices (also referred to herein as simply "clients"). In some embodiments, each client device can be wirelessly connected to the system at a different wireless channel.

At least one of the wireless networking devices is connected to the Internet and serves as a router (also referred to as "base"). The remaining wireless networking device(s) serve as satellite(s) that are wirelessly connected to the router via a dedicated wireless channel. One example of the multi-band wireless networking system is the NETGEAR® Orbi® system.

Channel Planning

The system can conduct an initial channel selection when the system turns on. Then the system conducts a channel change based on a schedule. If there is a need for an immediate channel change (e.g., sudden interference on a specific channel), the system can conduct a real-time channel change as well.

In some embodiments, the wireless networking devices of the system include radio components for three wireless bands, such as a 2.5 GHz band, 5 GHz low band, and 5 GHz high band. One of these bands can be dedicated to the wireless communications among the wireless networking devices of the system. The wireless communications among the wireless networking devices of the system is called backhaul communications. The other two bands can be used for wireless communications between the wireless networking devices of the system and client devices. The wireless communications between the wireless networking devices of the system and client devices are called fronthaul communications.

In some embodiments, the system uses the 5 GHz high band for backhaul communications by default and uses the 2.4 GHz band and 5 GHz low band for fronthaul communications. For example, when the 2.4 GHz band is used for fronthaul communications, each unit of the system can operate on a different channel in the 2.4 GHz band (a band can include multiple channels.) The decision for a best channel for each unit can be made based on various factors, such as network topology, number of interfering access points (also referred to herein as "APs") on each channel for each unit, noise on each channel for each unit, interference duration as percentage of time for each unit, type of network traffic supported for each unit, etc.

If the dedicated backhaul channel (e.g., a channel in the 5 GHz high band) goes down, the 2.4 GHz band can be used for backhaul communications among units of the system. For example, if a unit operating in satellite mode detects that the backhaul channel in the 5 GHz high band is no longer available (e.g., due to strong interference), the unit's 2.4 GHz radio component switches to a scan mode to look for an uplink connection at one of the 2.4 GHz channels with another unit operating in router mode.

If there are multiple clean channels available for a unit, the unit can pick a clean channel that interferes less with other units that are in the vicinity. A client channel can be defined based on a function of interference, number of APs, and/or other parameters. If the function for a channel is less than a threshold, the channel is a clean channel. There are various ways to detect units in the vicinity. For example, networking topology among the units can be used to detect units in the vicinity. Additionally, beacon power from other units can be used to detect units in the vicinity. In some embodiments, a unit can use a combination of networking topology and beacon power to detect other units of the system in the vicinity.

The units communicate the fronthaul channel selections with other units through the dedicated backhaul channel. In some embodiments, units having higher-priority network traffic can have a higher priority in picking the fronthaul channel over other units.

The system can make decisions regarding fronthaul channel selections in either a centralized way or a distributed way. In a distributed way, each unit can make decisions on channel selection for itself. For example, in some embodiments, a base unit can pick a fronthaul channel first. Then each satellite unit can pick a fronthaul channel after the base unit establishes a backhaul link with the base unit. The system can optimize the channel selection based on some regular schedule. In some embodiments, units handling higher priority network traffic can have a higher priority in picking the fronthaul channel over other units during system boot-up or during scheduled channel optimization.

In a centralized way, the base unit makes decisions regarding channel selections for all units of the system. Each satellite unit establishes a dedicated backhaul link with the base unit and scans the channels in the fronthaul band(s). Each satellite unit sends detailed information regarding candidates of fronthaul channels to the base unit. The detailed information can include, e.g., scan results on all channels in the fronthaul band(s) and interference on all channels in the fronthaul band(s). The base unit can make the centralized decision on channel selection periodically over time.

Figure 2:
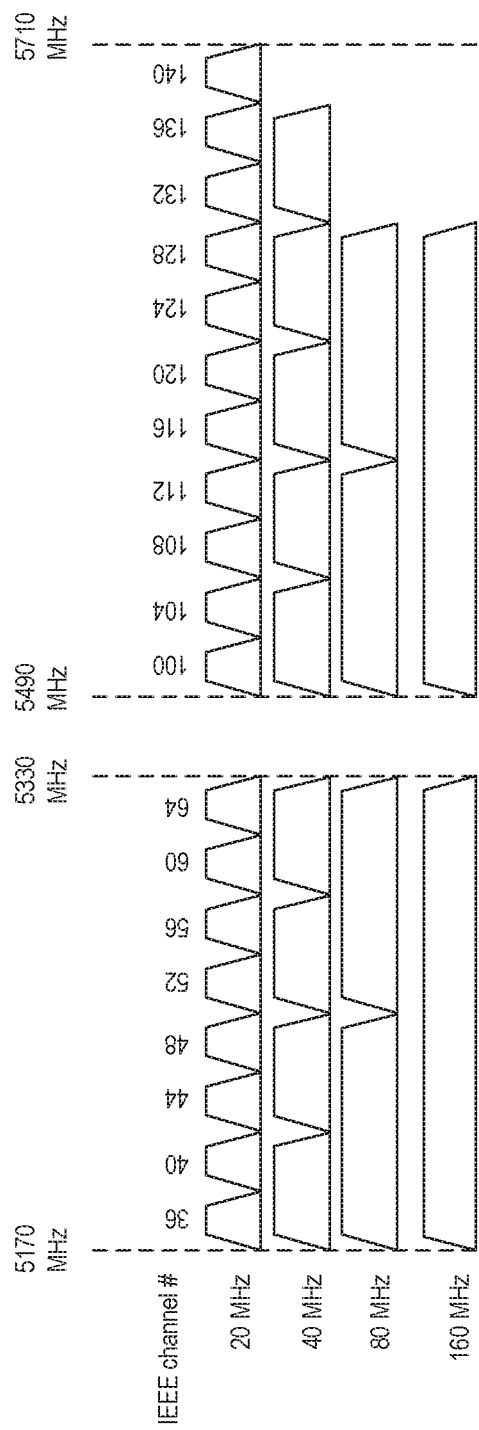
FIG. 2 shows a 5 GHz channel allocation in Europe.

The units of the system can also use 5 GHz channels for fronthaul communications. FIGS. 1 and 2 show 5 GHz channel allocation in North America and Europe. Some of the 5 GHz channels require a mechanism of dynamic frequency selection (DFS) to allow devices to share the channels (called DFS channels). Particularly, devices are required to have DFS capabilities for channels allocated to radar systems so that those devices do not cause interference to radars.

If a unit of the system does not have DFS capability to avoid radar interference, the unit may be limited to pick non-DFS 5 GHz channels, such as channels #36, 40, 44, or 48 as the primary 80 MHz channel on UNII-1. The unit can keep 80 MHz bandwidth and change the primary channel if the system has more control frames than data frames and mostly one AP is active. Alternatively, the unit can reduce bandwidth to accommodate channel planning in some use cases such as business use or busy home use. For example, depending on a total number of units of the system, the unit can reduce bandwidth to 40 MHz or 20 MHz.

If a unit of the system does have DFS capability, the unit can pick a DFS channel that is clear for usage for fronthaul communications. The units of the system can use different 80 MHz channels for fronthaul communications, since there are multiple 80 MHz channels available as illustrated in FIG. 1.

Similar to the 2.4 GHz case, the system can conduct the 5 GHz channel selection either in a centralized way or a distributed way. The channel selection can use different channels with different bandwidths. For example, a unit can choose among two 80 MHz channels, or four 40 MHz channels, or eight 20 MHz channels, or a combination of one 80 MHz channel and two 40 MHz channels, or a combination of one 80 MHz channel, one 40 MHz channel and two 20 MHz channels, etc. The bandwidth selection can be conducted depending on use case and amount of load. For example, if one unit (AP) has many clients and lots of traffic, the unit can receive more channels.

If the system uses the 5 GHz high band for backhaul communications, there is only one 80 MHz channel available in North America, as illustrated in FIG. 1. The system can decide to reduce the bandwidth, thus increasing the number of available channels. For example, if part of the 80 MHz backhaul channel is especially busy, the system can reduce the bandwidth to 40 MHz or 20 MHz. The system can make the decision for backhaul in a centralized manner. In other words, all units conduct channel scanning and send detailed information regarding the channels to the base unit. The base unit makes the decision for backhaul and broadcasts backhaul channel information to the satellite units.

If DFS channels are available for backhaul communications, the system can use those DFS channels. For example, there can be two 80 MHz DFS channels in North America, as illustrated in FIG. 1. For Europe, all 5 GHz channels are DFS channels. The system can pick the best DFS channel based on DFS channel availability and channel utilization parameters as well as power levels.

Wireless Optimization Using Artificial Intelligence and Machine Learning

Figure 3:
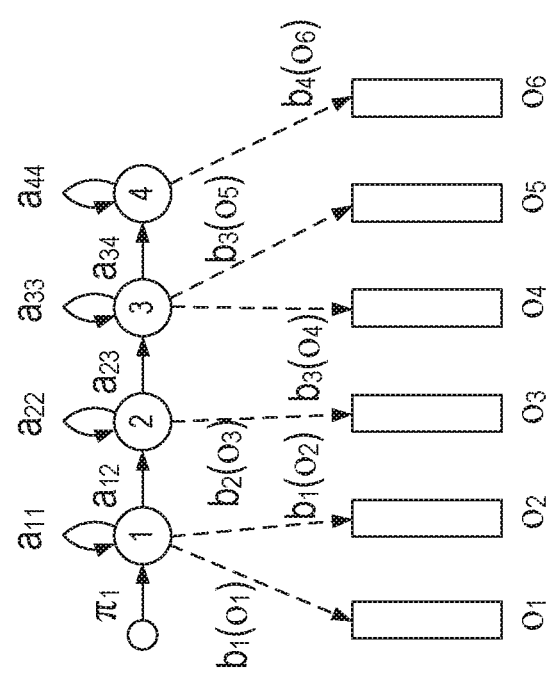
FIG. 3 illustrates an example of a state machine for a hidden Markov model.

The system can use artificial intelligence (AI) and machine learning (ML) technologies to model the interference on each channel. For example, units of the system can measure channel interference regularly over the time of day on all radios. The interference information is communicated to the base unit or a cloud server for pattern analysis. Interference measurements include interference from units within the system as well as interference from nearby devices. The base unit or the cloud server can recognize the pattern of the interference. For example, the base unit or the cloud server can use a hidden Markov model (HMM) to model patterns of channel interference, channel capacity, and channel outage. FIG. 3 illustrates an example of a state machine for HMM.

The system can also use AI and ML technologies to model network traffic. The units of the system can measure the traffic that is being supported during the day and reports the measurement to the base unit or the cloud server. The base unit or the cloud server can model the traffic usage using HMM or other statistical modeling tools. The statistical model is trained to predict the traffic that is being used on each unit of the system and the traffic can be used to decide which unit gets priority for network communication.

Figure 4A:
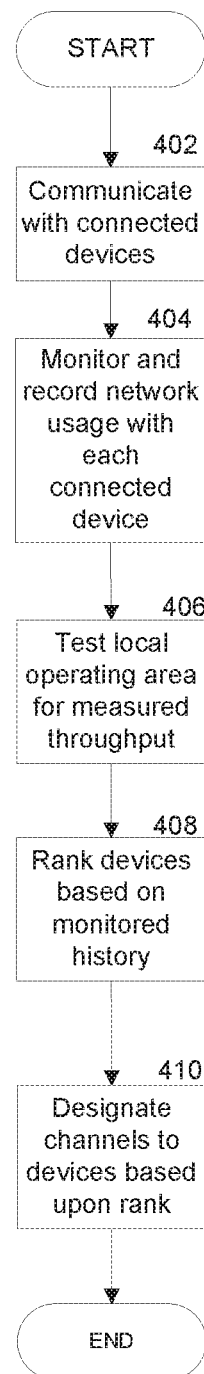
FIG. 4A is a flowchart illustrating a designation of channels.

FIG. 4A is a flowchart illustrating designation of channels. In step 402 a given access point communicates with a number of connected devices. Connected devices can include computers, smartphones, tablets, head mounted displays, or other suitable network enabled devices in the art. Each device communicates with the access point on a channel of a chosen wireless band.

In step 404, the access point monitors the network and bandwidth usage of each device connected. In terms of connection to a machine learned HMM, the monitored usage is the observed behavior. Monitoring the network usage of a device may refer to a number of aspects. Aspects of monitored bandwidth may include bitrate, latency, flow count, and mobility. Each of these monitored elements contribute to determining network behavior by a given device. Other detectable characteristics of clients connected to access points known in the art may be used to monitor network use.

Bitrate in this case refers to the number of bits downloaded or uploaded over a network over a given period of time. A high bitrate indicates high use. Bitrate in view of other factors provides additional information about the character of a client's network activity.

Latency is an expression of how much time it takes for a packet of data to get from one designated point to another. Latency is measured by sending a packet that is returned to the sender; the round-trip time is considered the latency. With respect to bandwidth, in this case, the important aspect of latency is how much is required. The latency required refers to the number of requests and/or packets to/from a given device, or application/utility operating on those devices. Having a high latency demand (and therefore a low measured latency) is consistent with "live" network traffic such as Internet gaming, VoIP, or video chat.

Flow count refers to the number of communicative connections a given device/application maintains during a given period of time. Each flow may have an individual bitrate that varies from flow to flow. A high flow count generally indicates a high amount of peer to peer activity or server behavior. Where an upload bitrate is higher than a download bitrate across the flows, it is more likely that the client is exhibiting server behavior rather than peer to peer.

Mobility refers to whether or not a client is generally mobile. In a single access point system, this is detectable by measured distance (signal strength) to the client. If this regularly varies, the client is mobile. In a multi-access point system, precise positioning of a client may be calculated and mobility is easily observable. While this is observed client behavior, this factor is used later with reference to measured throughput rather than client network use. A client, which is known by observation to be mobile, has a direct effect on measured throughput based on the location of the client. The greater information the system has about the location of the client, the more accurately the system may determine measured throughput.

In step 406, the system gathers a second set of observations for the HMM pertaining to the local area that the system operates in and identifying throughput of available channels. The observations identify interference within channel placement within a given band with respect to time. For example, if a given set of frequencies within a band experience interference consistently during a particular time of day, week, month, or year, the measured throughput of a channel intersecting that set of frequencies suffers. In some embodiments with multiple access points, observations are taken in consideration of the additional factor of positioning. Continuing the previous example, while the channel that intersected the set of frequencies with interference at a particular time may have reduced throughput at a first access point located at a first location, a second access point at a second location may not experience the same interference. In the second location, the measured throughput of the channel would be higher.

In some embodiments, observed, non-repeating, momentary interference is ignored and discarded. Examples of such are people walking through the lines of communication briefly. Additionally, there may be permanent interference at some locations (such as walls), and some frequencies may penetrate these permanent interferences better than others and have a greater measured throughput. In some embodiments, the highest measured throughput may be on an alternate band.

In step 408, the system ranks the clients. Each client may not necessarily be connected at the same time, but a recorded rank is stored for each client with a history of network use on the access point or system of access points. The rank may be adjusted as new observation of network use is recorded. Higher ranks are given to clients that have the highest observed network usage. In some embodiments, ranks are multi-factored and are not arranged linearly. In such embodiments, ranks may be arranged by highest requirement of a given exhibited behavior of style of use. For example, where a client may have the highest rank for low latency network use, the same client may have a low rank for overall bitrate.

In step 410, the system assigns connected clients channels based upon their respective rank. This step pertains specifically to connected clients because assigning channels to disconnected clients is a waste of bandwidth. Higher ranked clients are designated channels with a greater measured throughput. Throughput is a function of both channel width/size and interference within the placement of that channel within the band.

In embodiments with multi-factored rankings, designation of channel may vary. For example, a channel that has a smaller size/width but very low interference may be appropriate for a client with observed network use with demands for low latency but modest bitrate. Comparatively, a client that has observed network use behavior of high bitrate but does not require a low latency may be appropriately designated a channel with a large width/size but experienced intermittent interference (and therefore a highly variable measured throughput, but high maximum bitrate).

In some embodiments, where the channel with the highest measured throughput is designated to the highest ranked currently connected device, and a higher ranked device connects, the higher ranked device is designated the preferred channel, and other channels are re-designated according to the current rankings of connected devices.

In a manner of speaking, the method illustrated in FIG. 4A employs game theory in order to determine the optimal channel for the clients who will make the best use of those optimal channels. Additionally, this method operates on both single access point networks and multi-access point networks. Where there are multiple access points, a primary access point or the collected access points determine which access point is designated to which channels based on a similar theory. Rather than determining the greatest and optimal use on a client by client basis, some embodiments will determine these game theory aspects on an access point by access point basis.

Figure 4B:
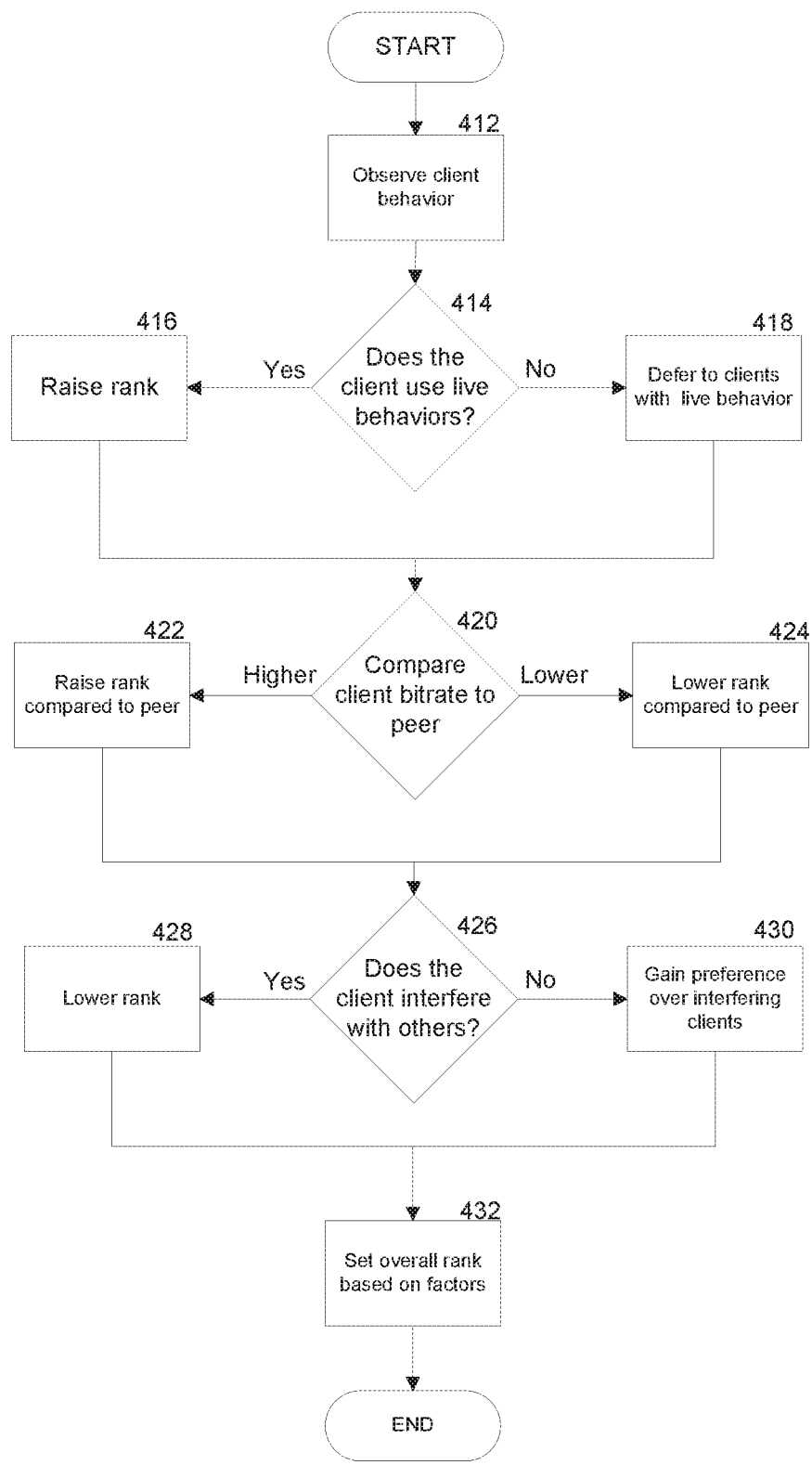
FIG. 4B is a flowchart illustrating a method to rank a given client against another.

FIG. 4B is a flowchart illustrating a method to rank a given client against another. In step 412, each client's behavior is observed as shown in FIG. 4A. The remainder of the flowchart of FIG. 4B is directed to a sample method of carrying out step 408 of FIG. 4A.

In step 414, the system analyzes whether or not a client has exhibited frequent "live" behavior. Live behavior refers to network activity requiring live, frequently updating connections to the Internet (ex: online gaming, VoIP, video chat). These clients are provided the highest preference. This is because interruptions in service to these clients will be the most disruptive to the user's experience. In many other heavy Internet usage cases, buffering is an option for reducing interruptions.

"Live" uses of a network cannot buffer and thus require low latency in order to function properly. Where a client does exhibit the "live" network use behavior frequently, the method moves to step 416 (the client obtains a higher preference when determining rank). Where the client does not, the method moves to step 418 (the client obtains no additional preference). An example of such preference is to count each "live" transmitted/received bit at a later step in a weighted fashion. "Live" bits may be counted as some ratio of non-live bits, i.e. 2:1, 1.5:1, or 10:1, etc. Any positive ratio will have a demonstrable result on overall ranking in later steps.

In step 420, a given client is compared to other clients for purposes of bitrate. Where the client has a higher bitrate than others, the method moves to step 422, where the client has an increased rank relative to the lower bitrate clients. Where the client has a lower bitrate than peers, the method moves to step 424, where the client has a reduced rank relative to the higher bitrate clients.

In step 426, a given client is examined for interfering behavior. Interfering behavior is behavior which significantly affects the performance of other connected clients in a negative way. Examples include peer to peer downloading that is disruptive to other clients. Where the client exhibits disruptive behavior, the method proceeds to step 428 and lowers the client's rank with respect to other clients. Where the client does not exhibit such behavior, the method moves to step 430, where the client is granted preference over disruptive clients.

In step 432, the totality of the data is taken into account, and ranks are set based on considered factors. This method consistently updates ranks based on the changing behavior of step 412.

Figure 5A:
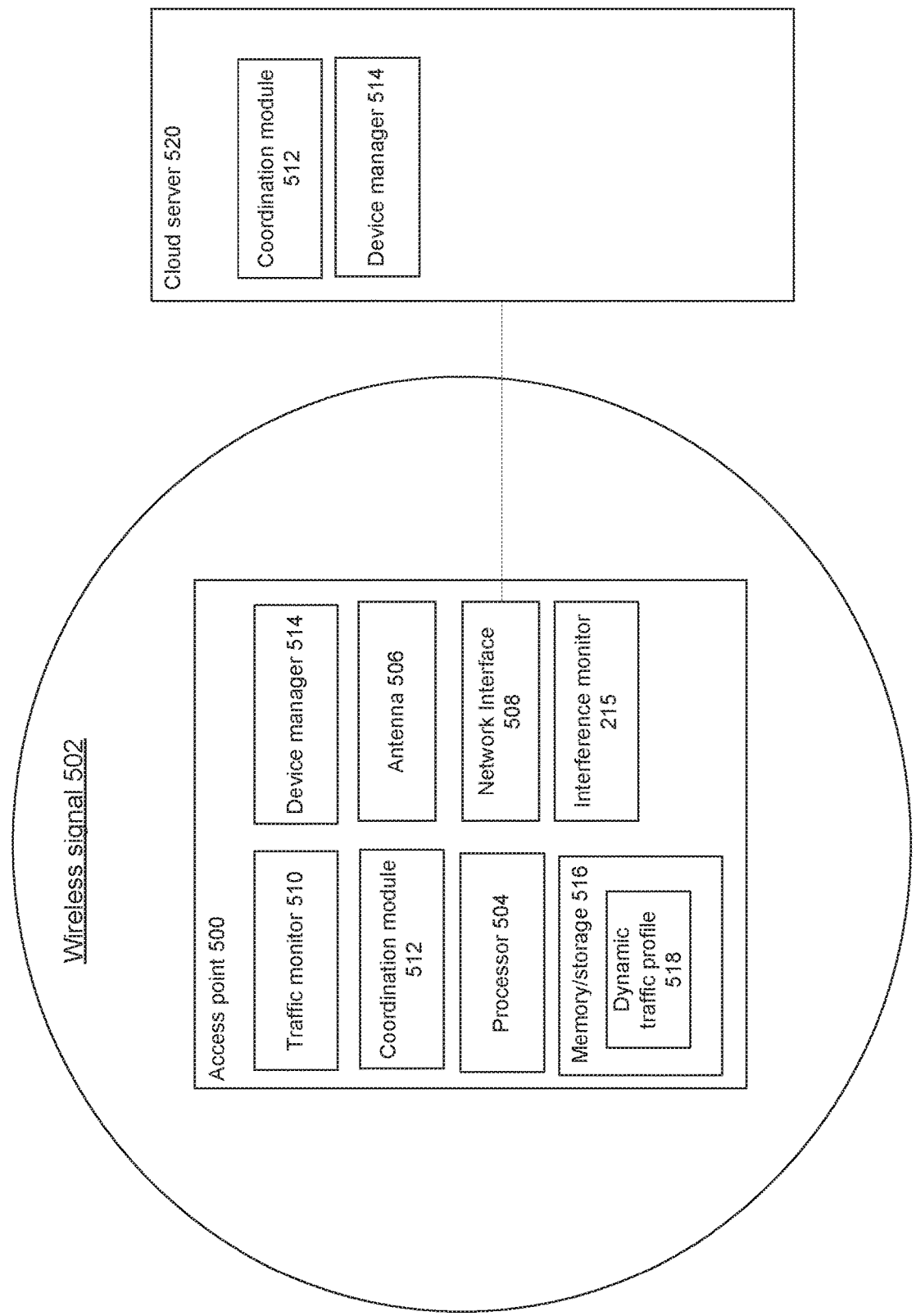
FIG. 5A is a system block diagram of an access point according to various embodiments.

FIG. 5A is a system block diagram of an access point 500 according to various embodiments. An access point 500 transmits a wireless signal 502 which clients use to connect to the access point 500 and, there through, the Internet. The access point 500 is processor based, and therefore includes a processor 504. Further included are at least one antenna 506 transmitting and receiving wireless communications and a network interface 508 for communicating with the Internet.

The access point 500 additionally communicates with neighboring access points 500 within the same network over a backhaul channel. Each access point is constructed similarly and has an organized topology based on the local environment.

The access point 500 includes additional modules: a traffic monitor 510, a configuration module 512, and a device manager 514. The traffic monitor 510 is a module designed to observe network behavior of clients connected to the access point 500. Where multiple access points 500 are on the same network, the traffic monitors 510 of each are coordinated, and all clients across the network are observed and compared. The observations are stored in digital storage 516 in a dynamic traffic profile 518.

The dynamic traffic profile 518 is continuously updated based on new observations. The traffic monitor 510 is configured to establish an event threshold to the dynamic traffic profile 518, wherein a network event, which is inconsistent with the dynamic traffic profile 518 and exceeds the event threshold, is ignored for the purposes of updating the dynamic traffic profile 518. Such events may include a one day influx of connection requests (such as from a party whereby a number of guests each having a smartphone attempt to connect to the access point 500). Where the observed behavior is wildly abnormal, the observations may be ignored.

The coordination module 512 uses the observations from the traffic monitor 510 in the dynamic traffic profile 518 to rank clients and designate channels in which the clients are to communicate with the access point 500. The coordination module 512 further directs client roaming to and from one of a number of access points 500 in a network system. In some embodiments, one coordination module 512 in a network of access points 500 is determined to be the primary coordination module and controls channel designation and roaming commands across the entire network system. In other embodiments, the coordination modules 512 of all access points 500 of a network system work in tandem to come to a consensus regarding the channel designation and roaming commands.

In some embodiments, the dynamic traffic profile 518 contains different observations for different periods of time (e.g., on weekends as opposed to week days, or during evening as opposed to midday). Further measured throughput at each of these times may also vary, and the observed local interference changes. Accordingly, the coordination module 512 adjusts operations to match the given day of week or time of day.

The device manager 514 is used to keep track of the type of device and operating system of historically and currently connected devices. Knowing the device/OS type of a given client improves the handling of the client from access point 500 to access point 500. Some clients accept BTM roaming recommendations, whereas some will not. Some clients will blacklist an access point based on the access point taking certain actions in a given period of time. The device manager 514 stores the device type/OS version for each client and follows a set of configuration instructions for all communications with a client device of each respective type/version.

In some embodiments, the access point 500 includes an interference monitor 515 that generates an interference profile, including historical measurements of a degree of interference at frequencies within the wireless band as a function of a variable location, the variable location determined by a positioning of each of the access points. Additionally, interference is monitored based on time of day and day of the week.

Wherein the coordination module further designates a particular channel at a given frequency range with a low measured degree of interference to a particular access point based on the interference profile at a particular positioning of the particular access point.

The device manager 514 may be configured by observed behavior by the access point 500 or from external configuration by a cloud server 520. In some embodiments, the cloud server 520 includes a coordination module 512 and a device manager 514. Coordination by the cloud server 520 enables learning and coordination by all access points 500 across all network systems of compatible access points 500.

Figure 5B:
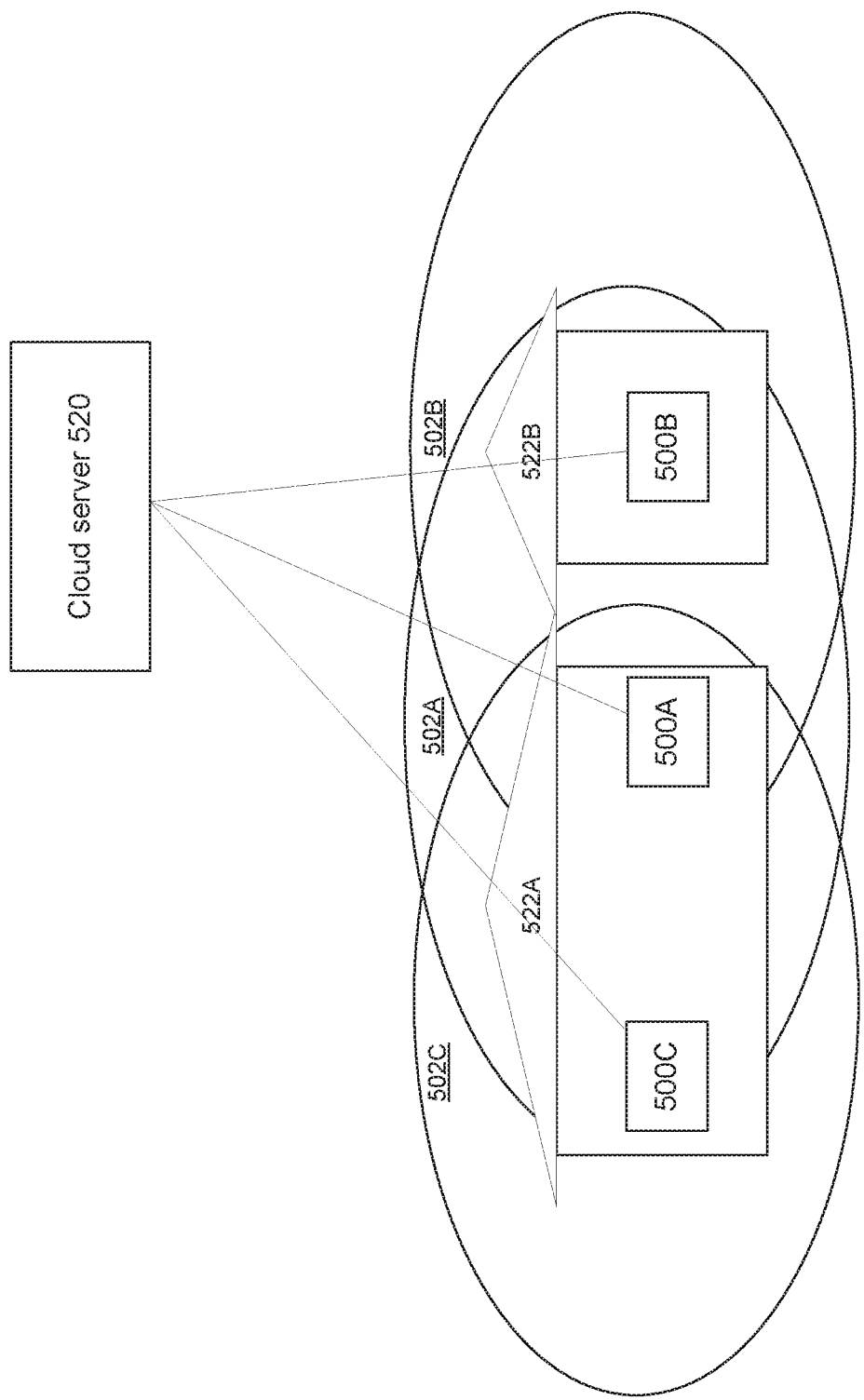
FIG. 5B is an illustrative example of a cloud configuration of a number of access points.

FIG. 5B is an illustrative example of cloud configuration of a number of access points. In an illustrative example, two houses 522A and 522B are neighbors. Each home has a respective access point 500A and 500B broadcasting independent wireless signals 502A and 502B. The wireless signals 502A and 502B are separate networks, and clients of one generally do not have access to the other. Nevertheless, the range of each wireless signal 502A and 502B overlap and cover at least part of the neighbor's home. In such an instance, where wireless signals 502A and 502B operate within the same band, each will interfere with the other.

However, where each of the access points 500A and 500B are communicatively connected to the same cloud server 520, the channel usage of each access point 500A and 500B may be coordinated with one another. As each access point 500A and B are associated with different networks and different users, neither network is provided preference over one another, but each network can work cooperatively. For example, channels designated for clients on each network may be chosen so as to not interfere with one another. As a given access point 500 reaches maximum connected clients, this cooperation is less effective. Before that threshold, coordination enables improved throughput for both systems.

Some variations are available in multi-access point systems. Assume an example where access point 500A is additionally networked with access point 500C. Access point 500C broadcasts wireless signal 502C. Wireless signal 502C does not overlap on house 522B, and thus it is unlikely that clients of 500B will experience interference from wireless signal 502C. Accordingly, coordination between the networks of 500A/500C and 500B may proceed where the channels used by 500B are not used by 500A, but are instead used by 500C.

To identify that two given networks are in fact connected to the same cloud server 520, a given access point detecting external networks may transmit network IDs to the cloud server 520 for verification. Where the cloud server 520 recognizes the second network, the cloud server 520 is enabled to coordinate cooperation between the networks without sharing any private information between users.

The system can use different utility functions on top of channel models for modeling different types of traffics and then optimize the channel accordingly. For example, voice applications do not need a significant amount of bandwidth but requires less outage (i.e. higher latency). A suitable channel can be selected for a unit that serves a voice application.

The system can also use AI and ML technologies to model client location patterns for roaming purposes. When an access point "roams" a connected client, or station, this refers to the process of pushing the client to another access point. A number of methods may cause roaming. A first method entails basic service set ("BSS") transition management, or "BTM." Specifically, BTM requests can be thought of as the infrastructure offering advice to the client. The infrastructure recommends the client re-associate to a particular access point.

A second method to roam a client uses drops and temporary blacklists. Specifically, an access point with a connected client drops that client and prevents the client from re-associating. In addition, any access points except the intended access point will forbid connection. Therefore, the device seeking a connection will connect with the only available access point.

For example, the system can learn from the pattern that when a client device's RSSI (Received Signal Strength Indicator) drops on some unit, it is likely that the client device is moving to another location, and whether the client device should be roamed from one unit to another unit or not. Such learning can be used to avoid extra information connection and avoid unnecessary state transitions between units.

Figure 6A:
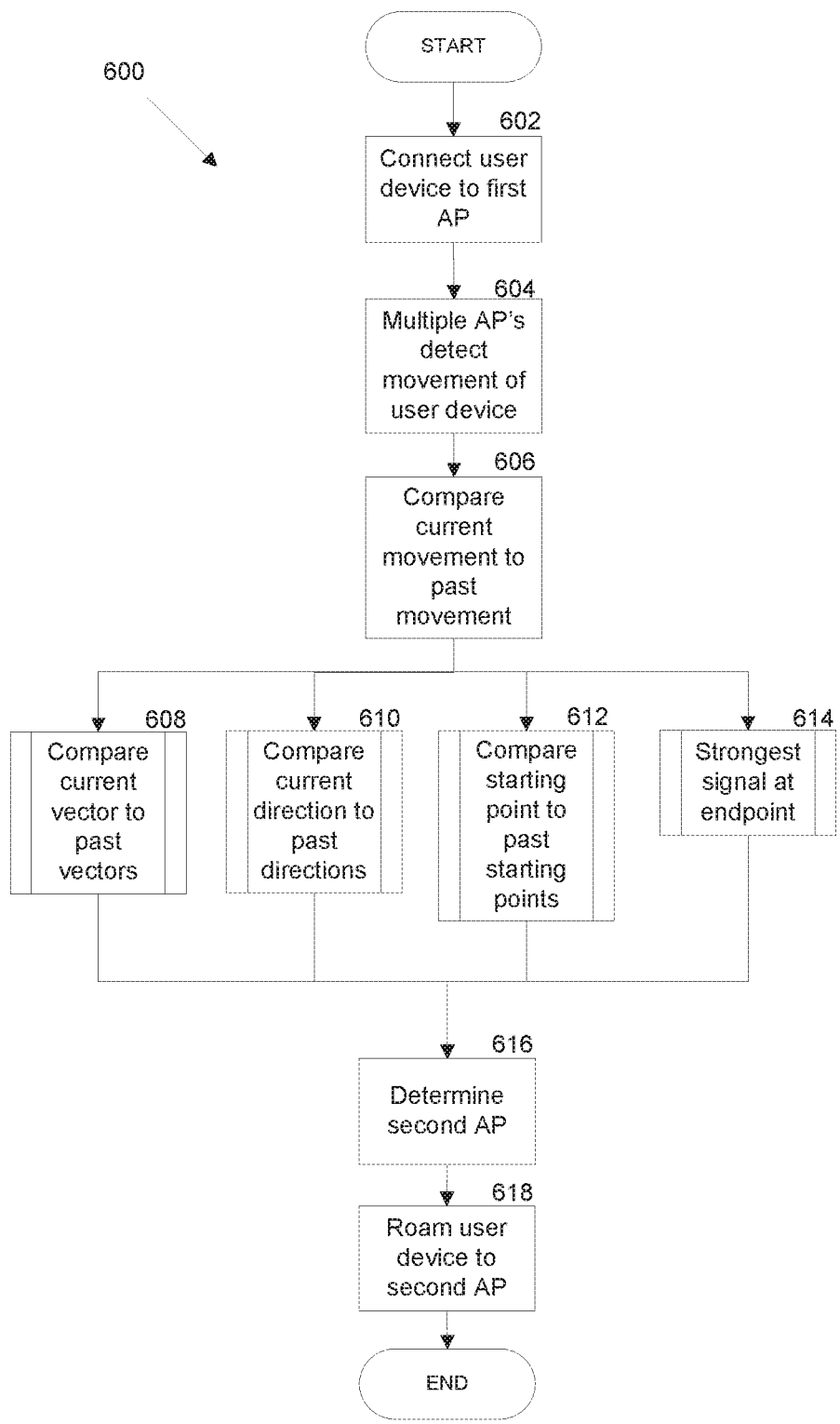
FIG. 6A is a flowchart illustrating an example of a pattern of a client device location.

FIG. 6A is a flowchart illustrating a method of pattern based roaming. In step 602, a user device connects to a first AP. This may be the first AP that the device comes into contact with within the network, or the device may have been previously roamed to this first AP. In step 604, the AP's of a network detect movement of the user device. The AP's detect movement through changes in RSSI measurements. Where three AP's detect the movement, the device's position may be triangulated to a particular location. Where there are less than three AP's, RSSI measurements provide directionality with respect to the detecting APs.

In step 606, the network of AP's compare the currently detected movement to previous, historical movements for the same device. The network of APs make this determination either by reaching consensus between processors situated in each AP across the network, or by a master processor situated in one, or less than the whole group of APs on the network.

Step 606 includes a number of sub-steps (608-614). In comparing current detected movement to past movement, the network compares a current vector to past vectors (sub-step 608); compares a current direction to a past direction (sub-step 610); compares a current starting point to past starting points (sub-step 612); and analyzes which AP will provide the strongest signal at a predicted endpoint (sub-step 614).

In sub-steps 608 and 610 the current movement may include multiple vectors and/or directions based upon the internal structure of the building the network is situated in (walls, halls, rooms, and furniture affect the path a user device may travel in). In some embodiments, a vector is determined based on the sum of multiple detected directions. In this way, multiple paths that are heading towards the same predicted endpoint are considered similar or the same. The comparison is generally made before the movement ends, and thus vectors are directions are often incomplete when the comparison completes. Thus, use of threshold matching is used to predict a completed current movement.

In sub-steps 612 and 614 the starting point and endpoints are compared so as to provide context for the vectors and/or directions. A vector having a parallel path as another, but starting at a significantly different position would not necessarily be optimal connected to the same AP. Starting points may are directly compared to historical starting points. However, ending points cannot be directly compared, as initial detected movement does not necessarily include an endpoint. In this manner, the current endpoint is predicted and compared to historical endpoints.

Given the output data of steps 606-614, in step 616, a second AP is determined as having an optimal signal for the user device after the movement. In step 618, the first AP roams the user device to the second AP. This avoids delay in having the device connect to other AP's that may intersect the movement of the device, though have sub-optimal signal strength.

Different clients behave differently in terms of roaming. Legacy clients that do not support 11v/11k/11r may be roamed using disconnection and then letting the client associate on a suitable band of a suitable unit. In some embodiments, following routing can be done only once every T1. A de-authentication packet can sent to client once RSSI and other conditions are met. The client can be allowed to roam back on desired unit and band. If a client does not roam to the desired unit and band in time T2, the system can allow the client to roam to any unit (AP) of the system.

The timing of roaming of some clients is critical. Some clients will blacklist the access point (unit of the system) if the roaming commands are too frequent. The system can be trained by conducting testing on clients and recognizing how often a client is disconnected or how long it takes the client to reconnect. The training will be used as the initial setting. Data that is collected in the field will be used to change timing, such as T1 and T2.

The system is trained to learn different types of client behaviors. For example, clients may respond to some type of 11k report and may not respond to some other type of 11k report. A client may respond to 11k once every T seconds. A client may roam in response to a Basic service set ("BSS") transition message ("BTM") once every T seconds. A client may roam in response to BTM when RSSI of serving AP (satellite unit) or host AP (base unit) is in certain range. The system can also learn when to request BTM and how often to request BTM.

Figure 6B:
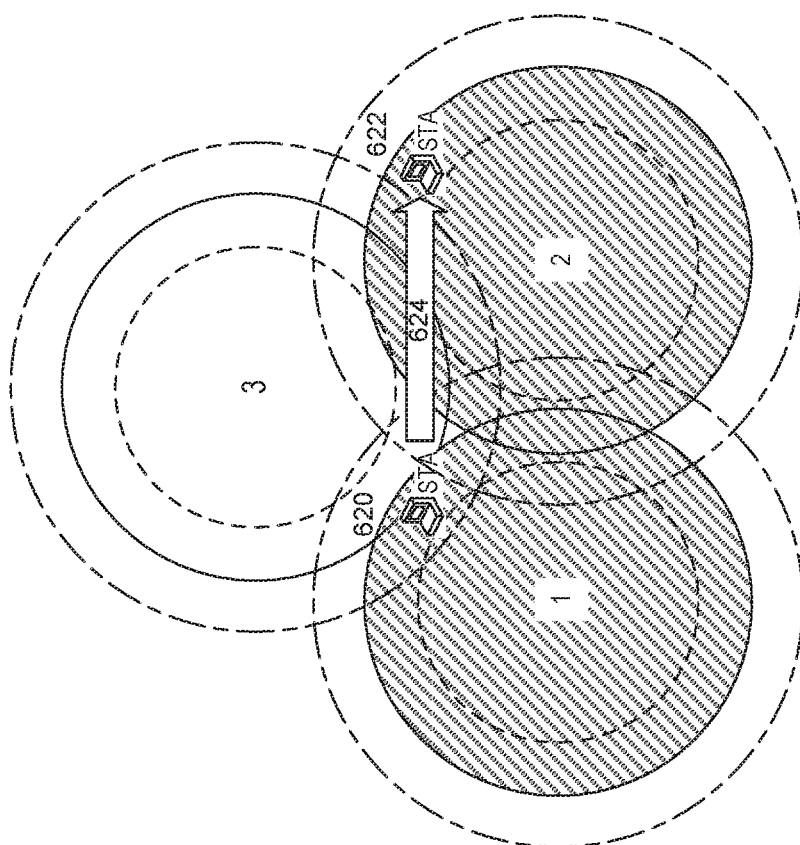
FIG. 6B illustrates an example of a method of pattern based roaming.

FIG. 6B illustrates an example of a pattern of client device location. The system recognizes the pattern that the client device, or station ("STA") will move from a location 620 to a location 622 with movement 624. The system also recognizes that during the movement 624, STA will travel through a place covered by unit 3. The system will predict that STA will end at a location 622 covered by unit 2. Therefore, the system will not roam STA from unit 1 to unit 3. Instead, the system will directly roam the client device STA from unit 1 to unit 2.

The system can also use AI and ML technologies to learn a given client's roaming behavior. The behavior varies both by the user's behavior and by the actual client device's behavior. Users often have repeat activity on their devices and operate these devices in predictable ways. AI and ML techniques can take advantage of this and optimize performance.

Figure 6C:
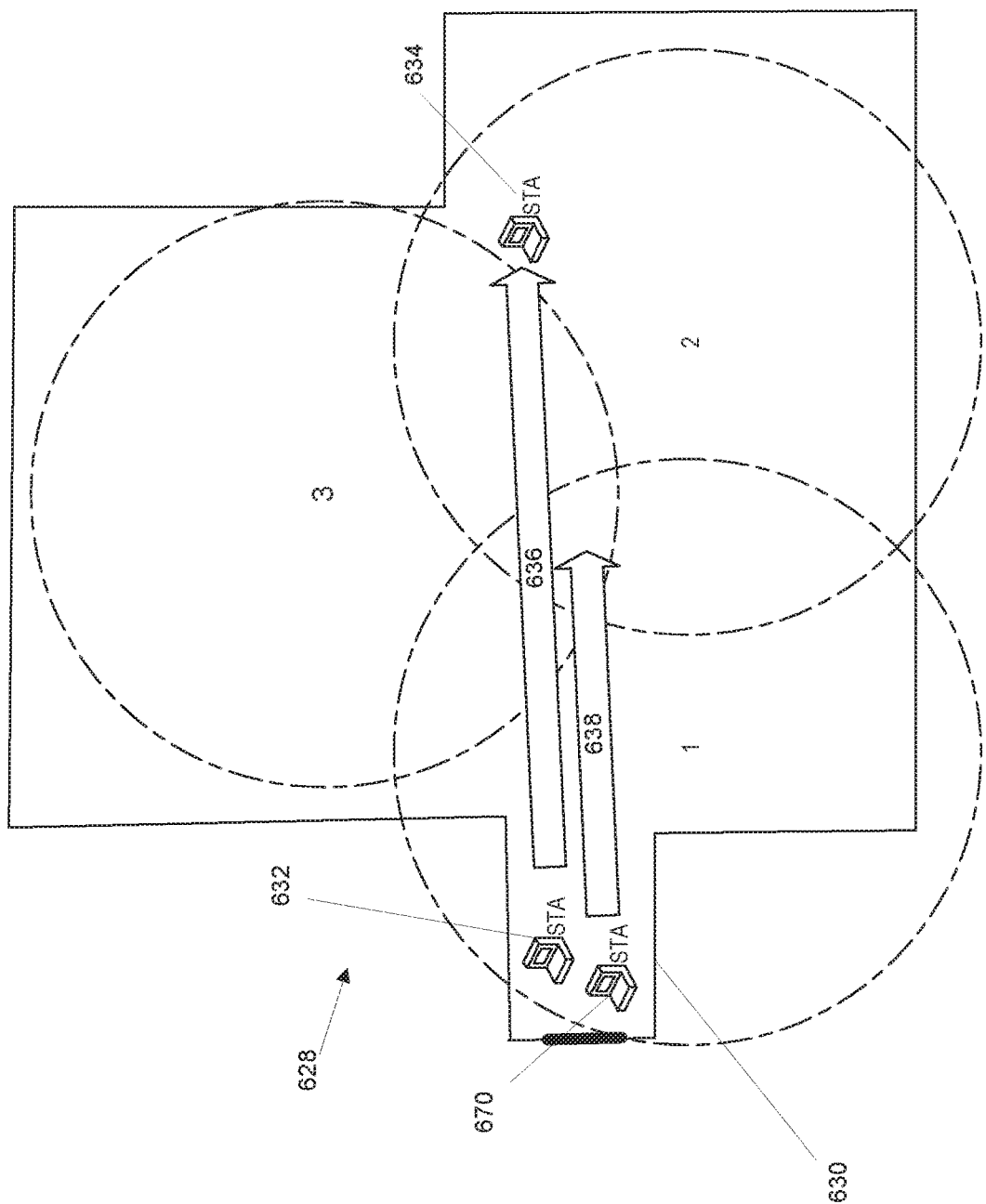
FIG. 6C illustrates an example of a pattern device roaming in a given space.

FIG. 6C illustrates an example of a pattern device roaming in a given space. In this example, consider a smartphone device which is commonly carried on the person of a user during the day and then left at a charging station at home 628. A network system such as that pictured in FIG. 6B includes a number of zones as delineated by access point ranges. Further, assume zone 1 covers a driveway and entryway 630 of a home, Zone 2 has coverage over a family room, and Zone 3 has coverage over a hallway and an extra room. Upon arriving at home 628, the user has a repeated pattern of behavior of entering the home 628 in Zone 1 at location 632, passing through Zone 3, and leaving the smartphone in Zone 2 at location 634.

The network uses historical movement 636 to compare to current movement 638 beginning at location 640. Current movement 638 has a starting point 640 that is similar to historical starting point 632. Additionally current movement 638 has the same direction as historical movement 636. Thus, this learned behavior is used to facilitate connections to the access point that covers Zone 2 without connecting to Zone 3, thereby preventing the smartphone from remaining inadvertently connected to an access point with suboptimal signal strength. While the example of FIG. 6C displays only a single direction, in some embodiments (and some buildings), the historical path 636 of the device includes a number of turns.

The system can also use AI and ML technologies to optimize network topology of the units based on usage pattern. The system can monitor the network traffic and determine the network topology. For example, based on the usage pattern, the system can determine backhaul channel, the satellite units directly connected to the base unit through backhaul channel, fronthaul channel, number of clients, etc. The system can make decisions dynamically based on the usage pattern. For example, APs (satellite units) with more traffic can get connection directly with main AP (base unit) on cleanest channel. APs (units) with higher amounts of traffic should get better client facing channels. APs (units) with higher amounts of traffic may push some clients to other APs (units).

Interference Management

A conventional router is a single device. In contrast, the disclosed multi-band wireless networking system includes multiple units (APs) to cover a broader area. Each unit of the multi-band wireless networking system is capable of transmitting wireless radio signals over multiple bands. Thus, the units within the system may overlap and interfere with each other. Furthermore, other devices that are not part of the system can also interfere with the units of the system. For example, FIG. 7 shows interferences within units of the system on 2 GHz and 5 GHz. FIG. 8 shows transmit and receive overlapping between the units.

In order to manage RF (radio frequency) interference on transmit side, the system uses algorithms to manage power levels of the units of the system. In some embodiments, the management of power levels can be built in the system management software of the units. The power level management can take into account the power levels (e.g., RSSI) between different units of the system and the power levels (e.g., RSSI) of associated clients.

In some embodiments, a unit can increase the power level for a limited duration to check if any new clients can connect to the unit. Then the unit drops to a power level that minimizes interference. The power management of system uses the dedicated backhaul channel to control the power levels of the units. The system also takes into account information such as client locations for power management purpose.

In order to manage RF interference on the receive side, the system adjusts the physical layer receive range by adjusting physical radio gain. The system can set up digital thresholds, such as preamble detection thresholds and timing and carrier recover thresholds. The system can also include controllable attenuation features to attenuate the radio power.

In some embodiments, the energy detection threshold for each radio component of each unit can be managed separately. The system also manages back-off count down numbers. For example, the system can modify 802.11 NAV parameters to manage the back-off count down numbers. The system can also tweak beamforming and MU-MIMO (multi-user multiple-input and multiple-output) parameters. The system can also modify RTS/CTS (Request to Send/Clear to Send) parameters of 802.11 wireless networking protocols to reduce frame collisions.

Figure 9:
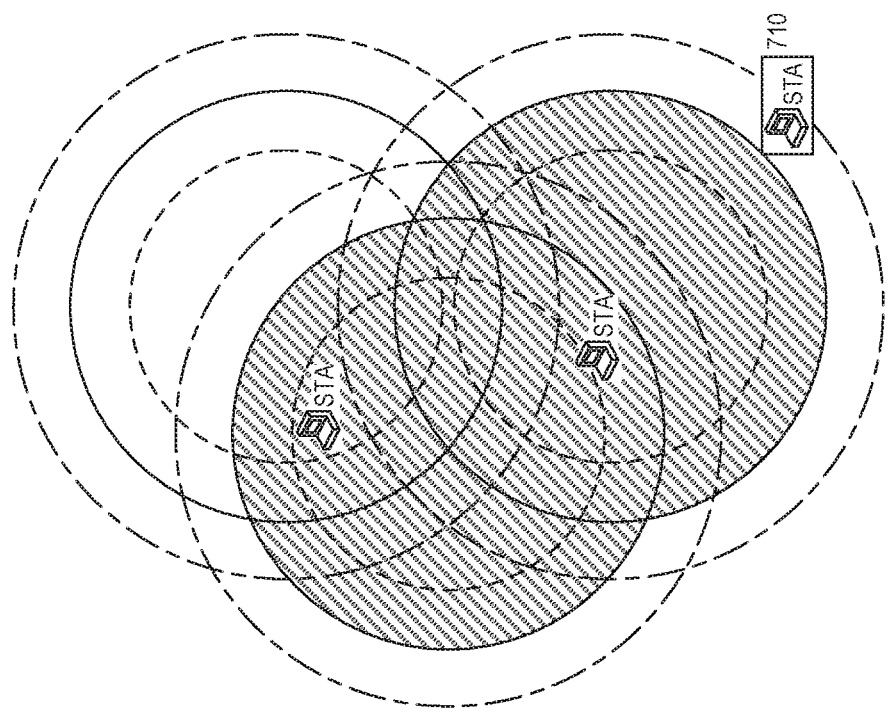
FIG. 9 shows a client device on the coverage edge of the system units.

For fronthaul management, the system tries to minimize the overlap between different units of the system in a way that clients on the coverage edge do not get disconnected. For example, FIG. 9 shows a client device 910 on the coverage edge of the system units. The system tries to minimize the overlap, but the wireless coverage is still enough to connect the client device 910.

In order to connect the client on edge, the units of the system can drop the transmit power based on the client RSSI and other client information. A unit can drop the power until the clients have a desirable transmit rate compared to what the clients had before the power was dropped. A unit can also increase transmit power once every X ms (milliseconds) for a period of Y ms. The unit checks whether any clients try to associate wireless with the unit and whether the association is successful.

The units of the system can adjust the receive range as well. In order to connect the client on edge, the units of the system can drop the receive range based on client RSSI and other client information. A unit can drop receive range until all clients have a desirable receive rate compared to what the clients had before the receive range was dropped. A unit can also increase receive power once every X ms (milliseconds) for a period of Y ms. The unit checks whether any clients try to associate wireless with the unit and whether the association is successful. In some embodiments, the increasing of transmit range and the increasing of receive range can be conducted at the same time.

In some embodiments, the system can learn the locations of the clients and adjust transmit or receive power levels depending on each client's location and receive sensitivity.

Dedicated Control Channel

In some embodiments, the system can use a dedicated channel (e.g., outside of 2.4 GHz or 5 GHz bands) for control information. For example, the units of the system might use 433 MHz or 900 MHz. The system can conduct frequency hopping between different channels. The units can include a wireless radio component for that dedicated channel specifically for communication related to control and management of the system. The dedicated channel will make the network among the units of the system more robust, since WiFi channels on 2.4 GHz or 5 GHz can have intermittent issues.

The dedicated control channel is used to transfer critical messages, such as bridge update (e.g., where client is associated), roaming coordination, timing synchronization, range measurement, etc. The dedicated channel can also be used for synchronization between units for localization purpose.

The dedicated control channel can also be used for provisioning. For example, the system can use the control channel to add a new unit to the network of the system without having to go through a standard process for WiFi, which takes a longer time, and is prone to interference and packet loss. An interface can be defined on the control channel, which enables the current unit (AP) on the system network to provision a new unit (AP) when the system administrator approves the addition of the new unit (AP).

If a satellite unit drops offline from the 2.4 GHz or 5 GHz WiFi network, units of the system can still signal each other indicating that the satellite unit is dropped from the WiFi network. This is feasible because the control channel can have a longer range that the 2.4 GHz or 5 GHz WiFi network. The units of the system can also signal each other regarding a change of the backhaul channel through the dedicated control channel.

Protocol Tunneling

There are various types of protocols that can be bridged (tunneling) over the backhaul channel of the system. For example, Internet of Things (IoT) protocols are low data-rate protocols that can be bridged over the backhaul channel. The advantage is that some of the IoT protocols have very limited range. By carrying over the backhaul channel, devices using IoT protocols can communicate over a long range that the original IoT protocols cannot handle. Likewise, Bluetooth range can be extended for various applications, such as IoT applications or audio applications.

The system can use different channels on different units for tunneling different IoT protocols. In some embodiments, the units of the system can have both WiFi and BLE (Bluetooth low energy) capability. Depending on the type of interfaces for the sensory devices, the units can use WiFi to connect to the devices, or use BLE to connect to the devices and tunnel the BLE communication over the backhaul channel. In some embodiments, one IoT protocol can be tunneling communications of another IoT protocol. The tunneling can be used for synchronization, protocol coexistence, power saving, etc.

Using the tunneling, the system can extend the range for perimeter sensors such as window sensor, door sensor, thermal sensor, moving sensor, etc. A sensor can connect to a nearest unit of the system. The network traffic from the sensor is tunneled to the base unit and other satellite units via the backhaul channel. The network traffic from the sensor can also be relayed to a cloud.

An instruction or action for the sensor can be transmitted to the sensor through the tunneling using the backhaul channel. A sensor may trigger an action for a target device, e.g., triggering an alarm or turning on a light. The target device (e.g., alarm or light) may be connected to another unit of the system. The sensor and the target device may communicate over a protocol such as Bluetooth, Zigbee, Zwave, etc. The protocol is tunneled through the WiFi backhaul channel.

In some embodiments, the system can control lights around a home using Bluetooth or other technologies. Bluetooth lighting control is becoming prominent but Bluetooth range is short. By tunneling the Bluetooth communications over the WiFi backhaul channel, the control range for the lights is significantly extended.

In some embodiments, the system can control audio speakers over a wide range. Audio speakers using Bluetooth is popular, but range is limited. The Bluetooth speaker can be paired with the units of the system. The audio synchronization over Bluetooth can be tunneled through the WiFi backhaul channel. The system can simultaneously control different types of Bluetooth speakers.

Zwave is used on lot of sensors and actuators, but the range is limited. The system can avoid Zwave mesh and use a long range dedicated backhaul to create a more robust Zwave network.

Topology Optimization

The units of the system (base unit(s) and satellite unit(s)) can form a network using different types of topology. For example, a daisy chain can be formed during the initial boot up of a unit. The unit connects to the base if the base connection is better than a threshold of X Mbps. If connection to base is less than X Mbps, the unit can look for base backhaul through another satellite unit. Best backhaul is selected using the link that maximizes a predetermined criterion. After initial backhaul selection is done, a periodic optimization of topology can be done, which maximizes a different criteria.

In some embodiments, each AP (unit) in the system network will advertise its uplink TPUT to main AP/base unit (uplink_i). The AP (unit) also advertises other factors including its form factor info, current load on the AP, and other information. The system uses a lookup table to map RSSI of beacon to effective TPUT. So for each beacon, the system can conduct an effective TPUT mapping (TPUT_lookedup_i).

Each AP (unit) in the system network can advertise. In some embodiments, the following formula may be used to select uplink node selection with best TPUT_i: 1/TPUT_i=1 (1/(uplink_i*scaling_factor_1)+1/ (TPUT_lookedup_i*scaling_factor1))*scaling factor_3*function(hop_count).

The system can also consider vendor IE content, such as capability, dedicated band, hop count, steering capabilities, transmit power, device type, scaling factors, receive sensitivity, etc. The vendor content is in layer 2. The system can also consider other parameters that can be communicated in higher layers such as traffic type, traffic priority, client type, client priority, etc.

The system can have scheduled topology optimization after the boot up phase. In other words, the topology may be optimized on a regular basis. During the optimization phase, information is collected during the time that units of the system are up and running. For example, RSSI information is measured from units of the system to other units of the system. Interference is measured on all units of the system. The system monitors traffic to supported clients to see how much load needs to be supported for each unit.

The system can also perform event-driven topology optimization. For example, if Backhaul link quality on any unit drops below some threshold, the unit may look for a new backhaul configuration. If effective, TPUT to the main AP (base unit) drops below some threshold, a unit of the system may look for alternative backhaul. The collected information over time will be used for event driven topology optimization.

The system can perform a topology optimization to turn off a unit or a radio on a unit. For example, if there are two units are close to each other, those two units do not help the wireless coverage. Clients may be switched between the first and second units back and forth. Thus, the system can turn off a radio on one of the unit. This can happen when a user misplaces two units close to each other. By powering down the radio, the system reduces interference and unnecessary client roaming. The unit is still connected on backhaul, and the radio being turned off can be turned on again at any time.

In some embodiments, some units of the system may use different powers and receive ranges. The topology and client facing radio and backhaul coverage play together. If topology is chosen such that a unit is sitting between two different units in a daisy chain, the backhaul power may be adjusted accordingly such that only the units that need to hear the backhaul can hear it. Thus, interference is minimized. The backhaul range may be increased periodically to see if additional units can connect to a unit of the system, or if the unit can find an alternative topology that is more sufficient.

In some embodiments, some units may use different channels or backhaul. In some cases, a client facing radio may be used as backhaul. Particularly, this may be done in the edge of a network. This is also useful if the backhaul channel is very busy due to extensive traffic on part of the network. When a client facing radio is used as backhaul, the backhaul channel is reevaluated periodically to see if the unit can use the dedicated backhaul.

Figure 10:
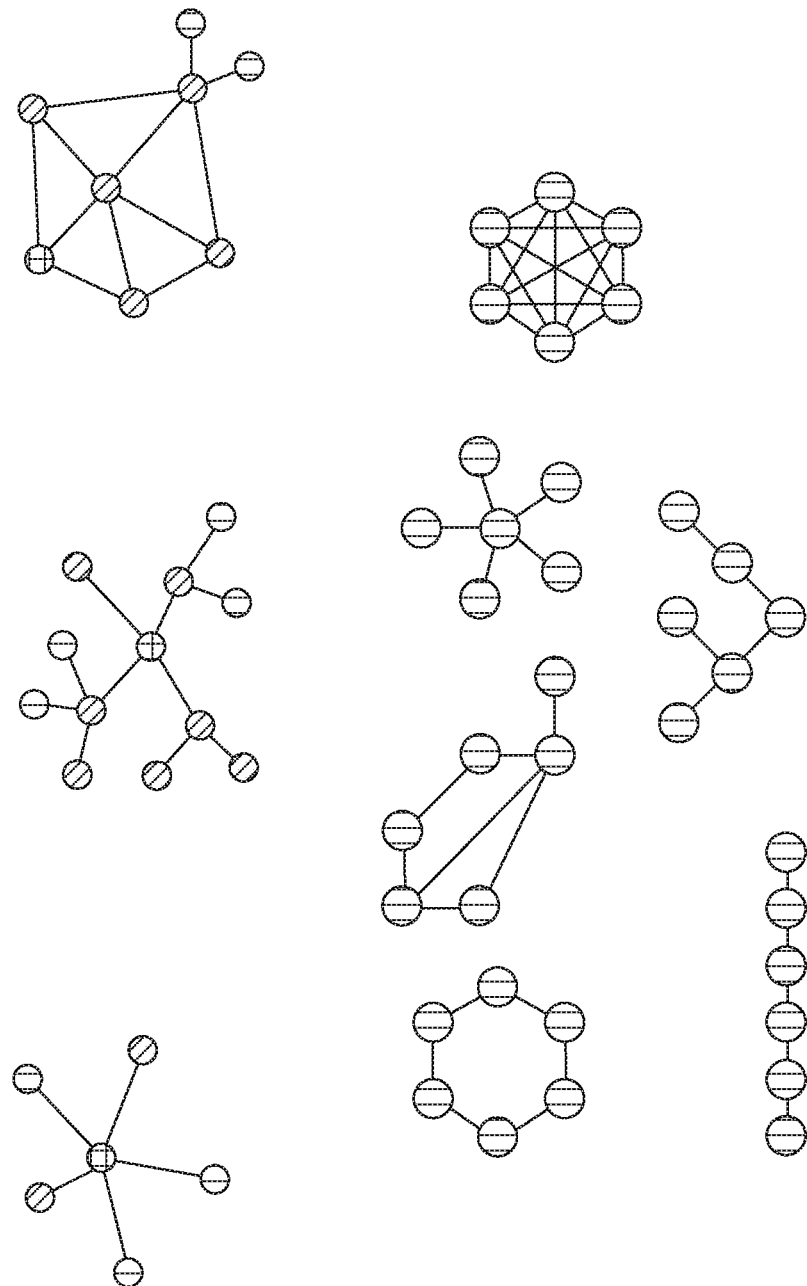
FIG. 10 shows different types of network topologies.

Different topologies may be used based on traffic needs and different types of units. Units can be desktop units, wall-plug units, or mini units. These different types of units have different requirements for power levels. FIG. 10 shows different types of network topologies.

The system can use different algorithms (e.g., Dijkstra's algorithm) to determine the best communication path between two units within the system. The system can change the weight values not only based on TPUT but also based on interference and priorities such as TPUT_lookedup_i*interference_weight*supported_traffic*Orbi_type*cpu. The system can also use other algorithms such as Bellman-Ford algorithm, A* algorithm, Floyd-Warshall algorithm, etc.

Security and Intruder Detection

Network Security is important. Nowadays, almost everybody has a phone with them when they move. The phone may be used to detect an intruder of the network. Particularly, intruder detection can use the solution of monitoring WiFi and Bluetooth activities with multiple units of the system. Indoor localization techniques can also be used. The system may monitor a probe request to detect the presence of a new device. If a certain RSSI pattern is seen on a new MAC address, the information can be used for intruder detection. Also, a certain time of arrival or round trip delay on a new MAC address or AID may be used to detect intruders.

Figure 11:
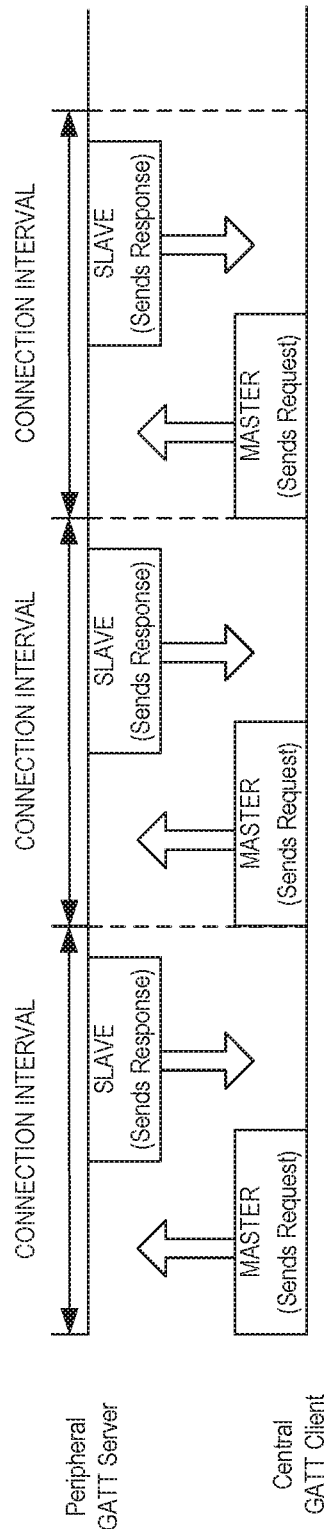
FIG. 11 shows the communications between GATT (Generic Attributes) servers and clients.

Particularly, the system may use GATT (Generic Attributes) Profile usage for intruder detection. FIG. 11 shows the communications between GATT servers and clients. The system can use GATT MAC address and UUID (universally unique identifier) to detect new devices. Signal strength or time of arrival of SLAVE response may also be used.

The system may use the localization techniques available on WiFi and Bluetooth for intruder detection if the device is known or the system can localize a new unknown device. The system can use long dedicated backhaul to do the coordination between units as a detection mechanism for intruders. The system can use Bluetooth packets that can be sent to a new device to detect an intruder. The system can use pre-association WiFi for intruder detection. The system can combine all methods available for pre-association of WiFi and for new Bluetooth device to provide robust intruder detection. The system can use higher frequencies such as 28 GHz, 60 GHz for more accurate radar type intruder detection.

When an intruder is detected, the information may be communicated to the user via, e.g., phone app, audio alarm, lighting alarm, email, text message, phone call, etc. Video may be recorded using in home camera when an intruder is detected. Audio may also be recorded.

Figure 12:
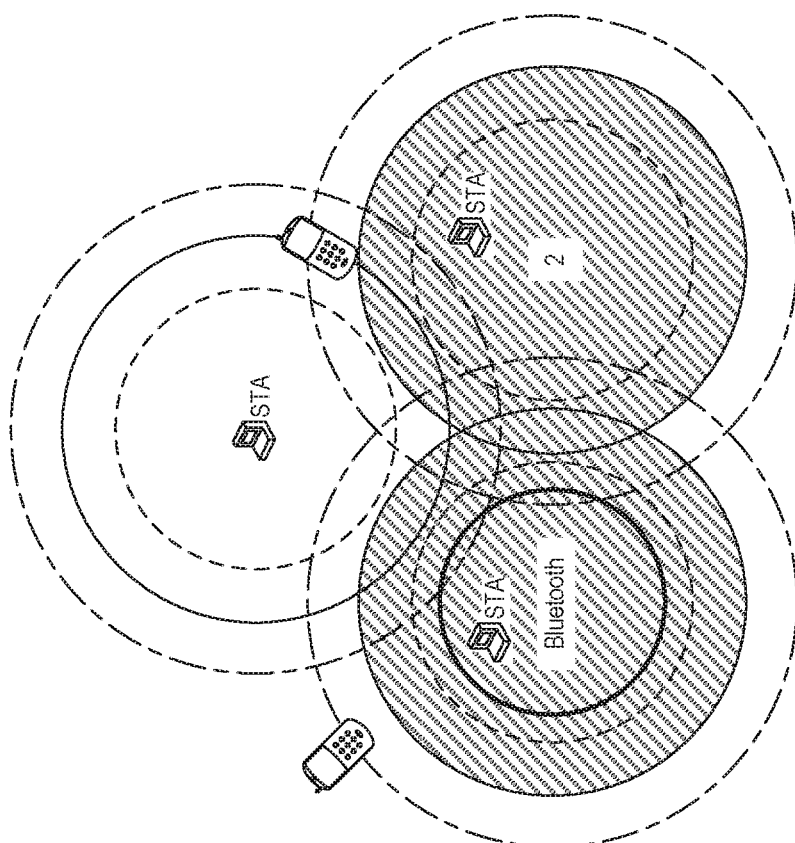
FIG. 12 shows an example of a detected intruder device.

The system can recognize the pattern of movement of devices which may belong to an intruder. Different patterns can be learned over different time of the day, for example between 1:00 am to 5:00 am, the pattern may be different than 4:00 pm to 8:00 pm. The pattern can be learned over time by seeing the RSSI of request that comes over Bluetooth or WiFi for unknown devices. The pattern can related to, e.g., RSSI, time of arrival, phase of arrival, etc. FIG. 12 shows an example of a detected intruder device.

The system can learn, over time, the patterns of devices. For example, during the first few hours or few days, the system may be trained to the MAC address of a known device at home. The system may also learn the MAC address of a neighbor device and other devices that are regularly within range. After a few days, the system may start sending alerts if the MAC addresses of devices are suspicious.

Figure 13:
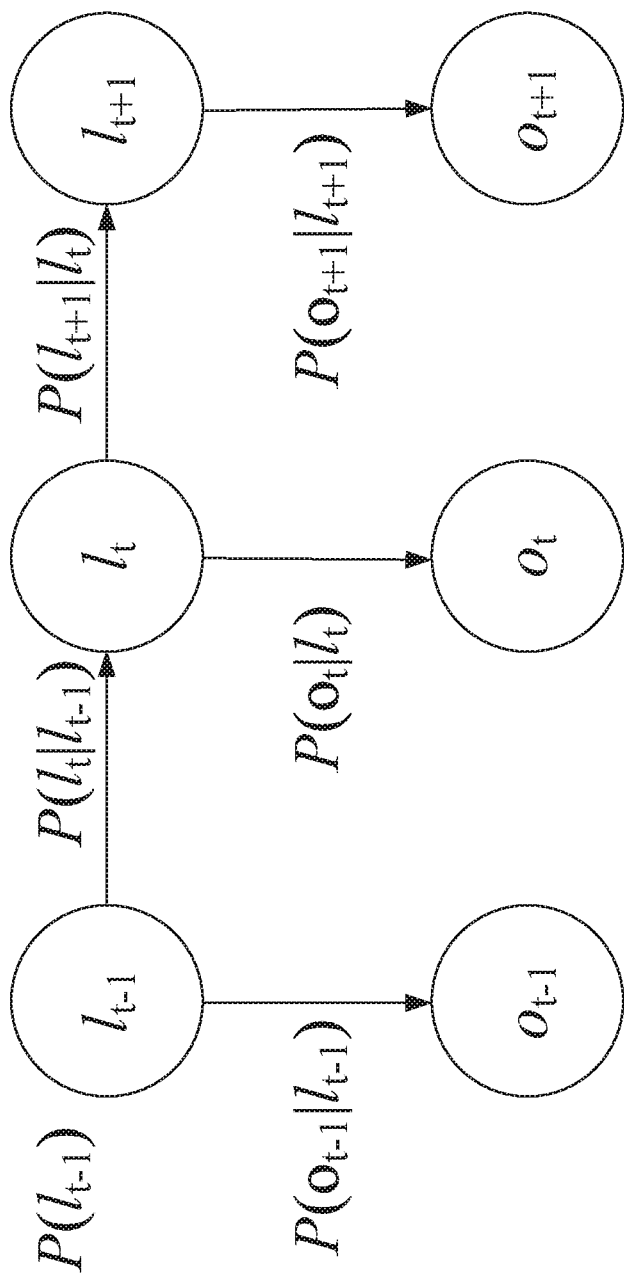
FIG. 13 shows an example of an HMM for modeling device movement.

HMM may be used to model movement of unknown clients and see if they are at a location they should not be. First order HMM may be used to model movement in and out of house or different locations. FIG. 13 shows an example of an HMM for modeling device movement. Lt can be a different part of a property. It can be RSSI or time of arrival.

Figure 14:
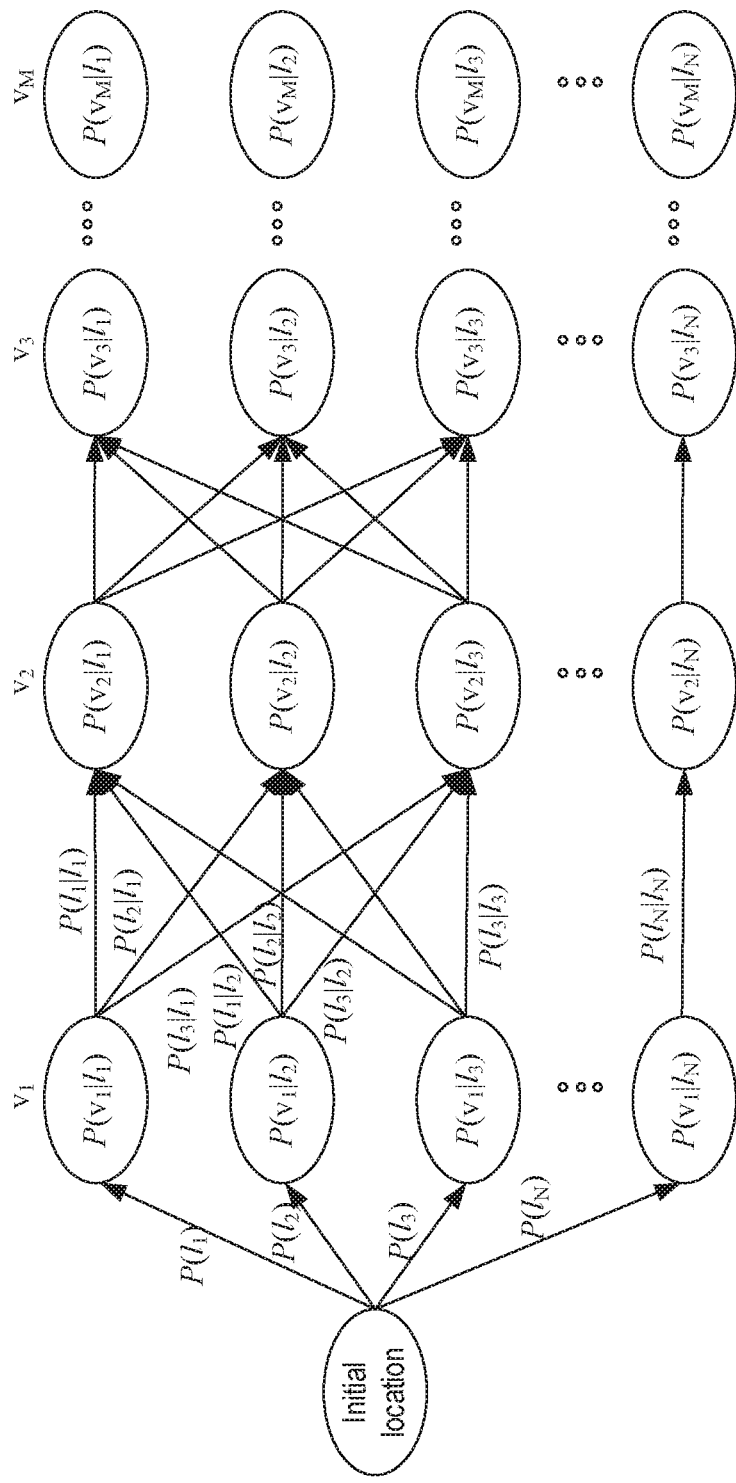
FIG. 14 shows an HMM model for coordination and time measurements.

The system can use Backhaul for coordination and time measurements. FIG. 14 shows an HMM model for coordination and time measurements. For example, given a set of RSSI variation trends, V=fv1, v2, . . . , vM and a settled HMM, the hidden location sequence L=fl1, l2, . . . , l_N can be estimated by employing the Viterbi algorithm.

Figure 15:
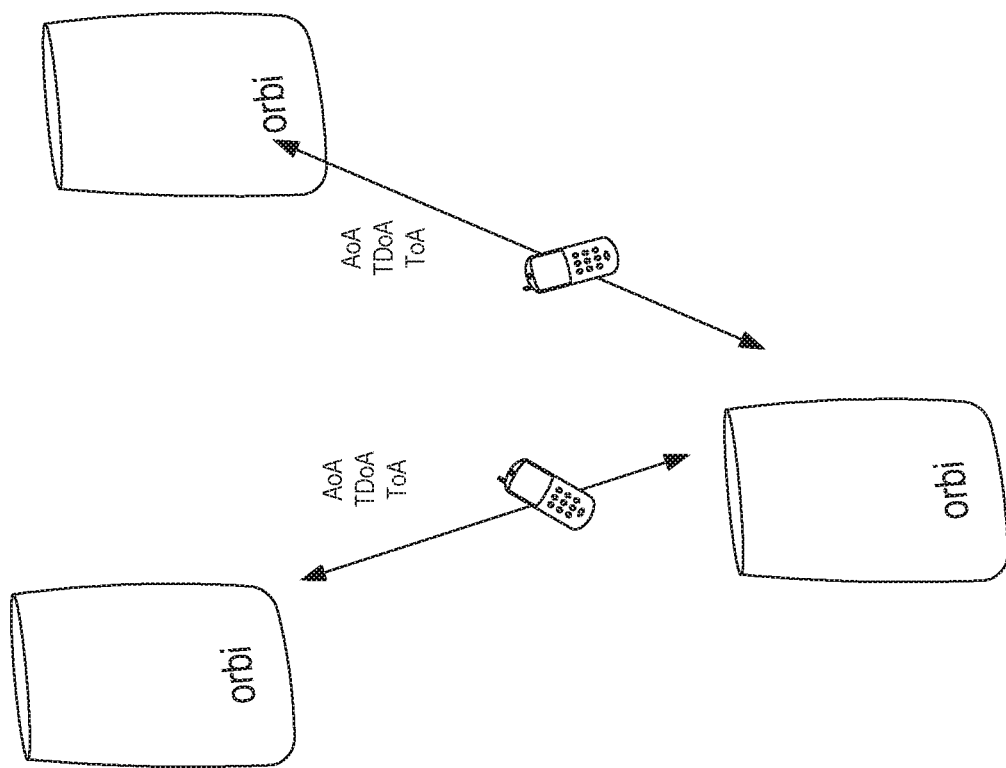
FIG. 15 shows intruder devices that are between the units of the system.

Data packets between units of the system may be used to detect an intruder device moving between the units. FIG. 15 shows intruder devices that are between the units of the system.

Deep Packet Inspection

Figure 16:
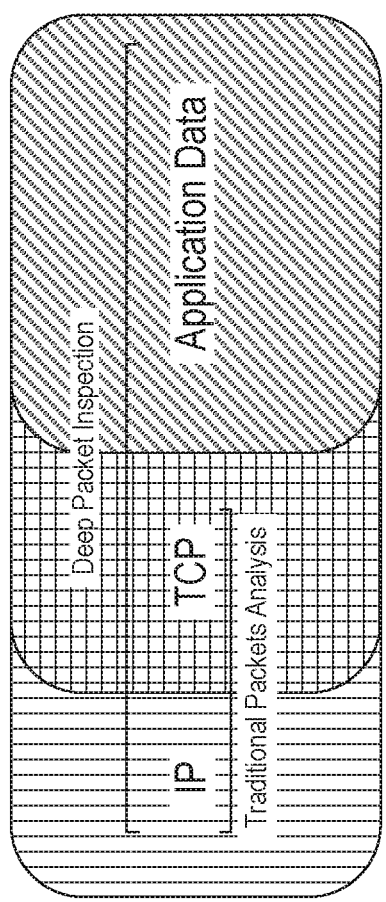
FIG. 16 shows the architecture of Deep Packet Inspection (DPI) technology.

The system can use Deep Packet Inspection (DPI) technology to analyze traffic from different devices and to differentiate them according to their payload. DPI AP (unit) may look at traffic from a specific IP or MAC address, pick out the HTTP traffic, then drill even further down to capture traffic headed to and from a specific sever. FIG. 16 shows architecture of Deep Packet Inspection (DPI) technology. For example, for application of email mail server, the system can reassemble e-mails as they are typed out by the user. DPI can feed back information on device type, length of connection, frequency of connection.

The system can use DPI to classify IP traffic patterns and user behavior and act on that information. For example, the system can use DPI to improve network performance, to control WiFi congestion, and to enhance quality of experience (QoE). The system can also use DPI to make the system application-aware in scenarios such as roaming behavior being adjusted based on DPI, topology selection according to DPI, WiFi priority (e.g., EDCA (Enhanced Distributed Channel Access,) parameter), or power saving related behaviors.

The system can use DPI for band steering and AP steering. Some devices may be considered static devices in the home (which are not moving). For example, set-top-box (STB) can be characterized as static and, unless sudden change in RSSI is made, we do not need to consider STB for roaming. Solar panels may be recognized as fixed devices which do not require high bandwidth, so they may be kept in 2.4 G and do not need to be steered to 5 G or to another AP.

Figure 17:
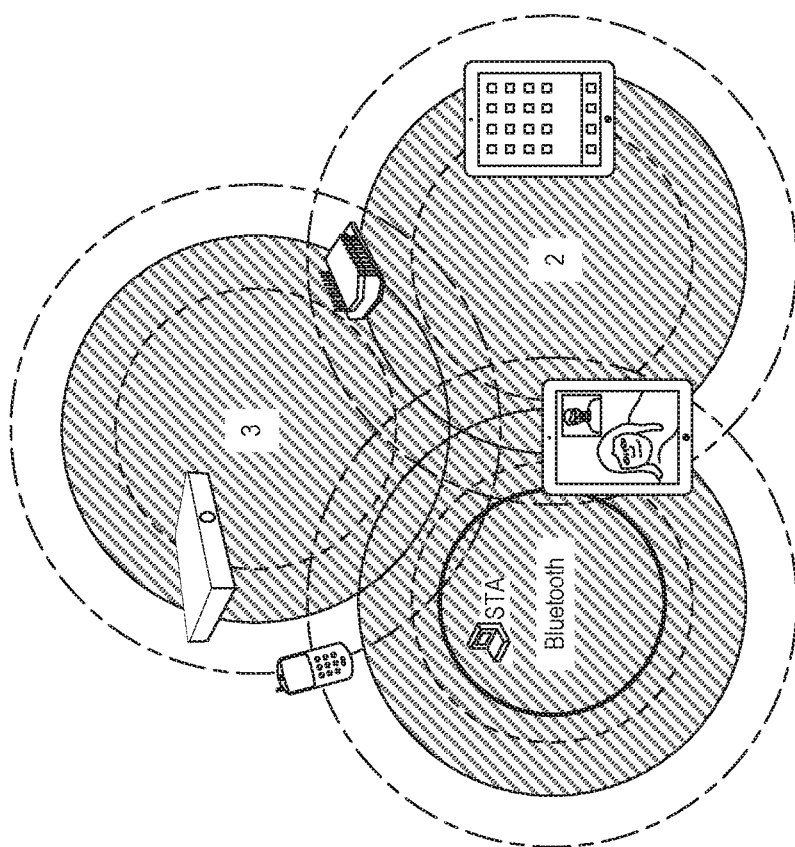
FIG. 17 shows devices that have different needs for power and data throughput.

The system can use DPI for power saving. For example, a sensor device may be recognized as a low power device, and it may be kept on a band that receives less power. 2.4 GHz power amplifiers are more energy-efficient than 5 GHz, so the client may be kept in 2.4 G, even if it can be roamed to 5 G, especially if bandwidth requirement is relatively small. If the device traffic pattern change and high bandwidth traffic is initiated, then the client may be steered to 5 G where packets may be sent in a faster way. Channel may be switched if another channel appears better for a power sensitive device. FIG. 17 shows devices that have different needs for power and data throughput.

Using DPI, the system can learn traffic over time. In other words, the type of traffic that is conveyed over a certain device may be learned during this time. The traffic type (voice, video, data, etc.), the amount of traffic (Mbps), and the combination will be learned. If a device has lot of heavy traffic (file download, Linux distribution), it should be put on a band or on an AP (unit) that has the highest TPUT. A device that is primarily used for audio should be on a band that has the least delay variation and packet loss. A unit may not be roamed at the middle of a VoIP call as far as bandwidth, delay, and packet loss are at acceptable levels.

The system can also use DPI for topology and channel selection. For example, the traffic load may be measured in part of a network to see how much airtime and data bytes are sent over the air. If the medium utilization goes more than X percentage (a threshold value), the units that have high medium utilization may be given higher priority in backhaul channel selection and front haul selection. The unit with higher traffic may roam some clients away to other units with less traffic.

Roaming

The system can conduct, e.g., 11k RSSI measurement, when different APs (units) are on different channels for roaming purposes. However, an 11k with multiple channel requests will not work with many clients. The system requests the client to conduct an 11k response on the current channel and to conduct uplink/downlink calibration. After that, the system uses calibration to estimate downlink power based on uplink power. The system conducts 11k on the candidate AP (unit) and infers 11k measurement based on last received packet on the serving AP. The system compares the downlink measurement on the other AP with an estimated downlink power on the current AP. Then the system makes decision whether to do roaming or not.

The system can conduct uplink/downlink calibration using 11k. When a client supports 11k, the system performs the 11k measurement to see what the difference in power is. Later the system can use the information and does not need to ask for an 11 k measurement on the serving AP if other APs are on other channels. The system asks for a measurement report on the current channel, and the system receives the 11k report. The system compares the downlink power mentioned in 11k report to the RSSI of the 11k report packet and comes up with a delta measurement. Several measurements may be done so the power difference can be averaged over multiple measurements. This is done so that the measurement is more accurate. The system can help rate control.

The system can operate in a monitor mode for a legacy client with APs on the same channel. With the monitor mode, the other APs can go into sniffing mode to detect clients. A limited number of clients can be sniffed. If another AP is better by some margin, roaming can be triggered. Once another AP is deemed better, the system can use different roaming mechanisms to conduct the roaming. APs are calibrated so that RSSI measurement is more accurate than the client.

Figure 18:
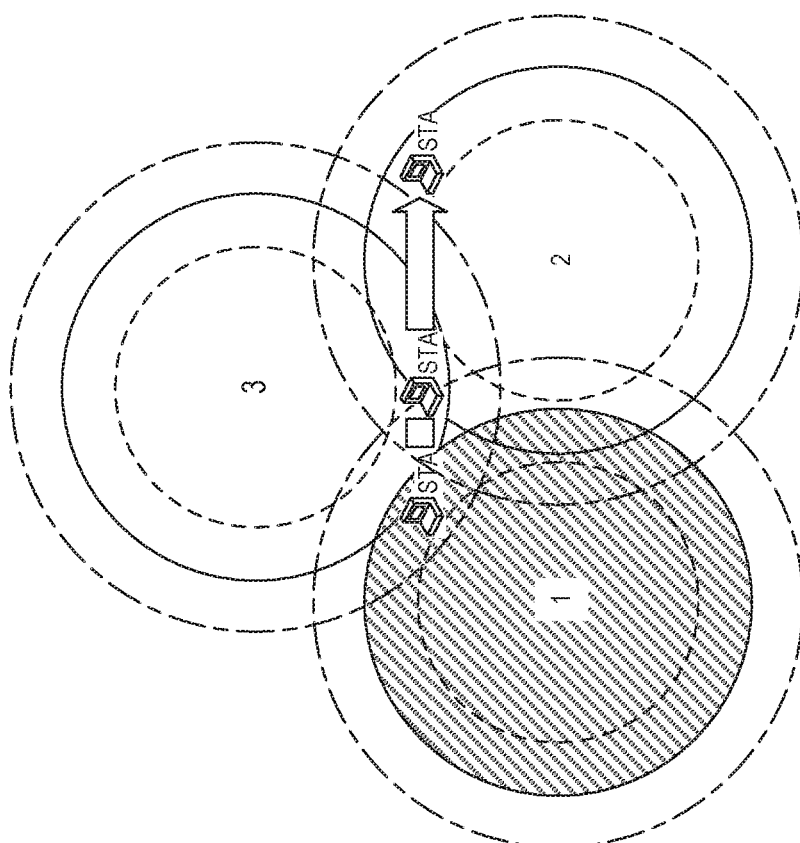
FIG. 18 shows that monitor mode can be triggered in middle mode.

The system can monitor client selection. Legacy clients with RSSI smaller than X can be monitor mode candidates. Clients with which an 11k request fails can be candidates for roaming. Clients with which 11k measurements are not accurate can be used. When the 11k measurement has a delay that is larger than the desired level, the client may be a candidate for monitor mode. Monitor mode can be used to calibrate the transmit and receive power differences. FIG. 18 shows that monitor mode can be triggered in middle mode.

The system monitor mode can use a fast channel switch. An AP needs to hop to another channel to make a measurement. Coordination needs to be done for the AP so that it can hop to the other channel and hop back. The AP needs to make sure when it jumps to other channel that the current client does not treat the AP as disconnected.

The monitor mode can be on different channels. Channel switch coordination can be done over a dedicated backhaul. The system asks the non-serving AP to come to channel of the serving AP, does a measurement, and then goes back to the current channel to send measurement data back to the serving AP over a dedicated backhaul. The AP will send a control packet on its channel indicating it is offline for a time period. In this case, the uplink RSSI is measured and compared between different APs on different channels.

Indoor Object Tracking

Indoor positioning is one of the most challenging problems. For areas where there is a line-of-sight (LOS) to satellites, the GNSS (Global Navigation Satellite System) provides a good estimate (within a few meters) of a mobile user (MU) location. Signals coming from satellites cannot be currently used in most indoor environments due to the fact that they are not strong enough to penetrate most materials. Infrastructures which offer strong signals indoors should be used for indoor localization or tracking such as 802.11, BLE, Bluetooth.

Applications for indoor localization/tracking includes, pet tracking, asset tracking (e.g. phone tracking, shopping mall asset tracking, etc.), indoor navigation, asset tracking and troubleshooting, getting locations of units that have issues, getting locations of WiFi devices that have issues, getting locations of Bluetooth devices that have issues, retail analytics, tracking people movement by tracking their cell phones, measuring how long people stay in some locations, elder location, valuables tracking, burglar detection, etc.

The system can use the localization techniques available on WiFi and Bluetooth. The system can use a long dedicated backhaul to do coordination between units that is required to come up with accurate location. The system can use Bluetooth on several units as opposed to only a main unit, which helps with locating a low range Bluetooth device. The system can use Bluetooth triangulation, WiFi triangulation, or a combination thereof. The system can use GPS from phone APP to help when possible. 60 GHz may also be used for better accuracy.

Figure 19:
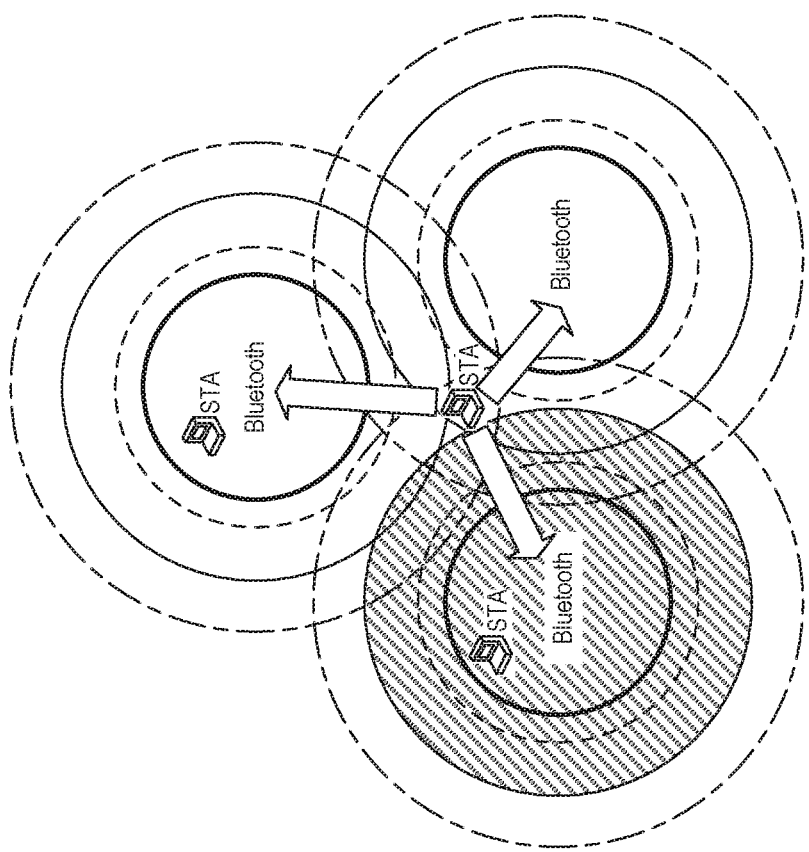
FIG. 19 shows time of arrival and amplitude measurements for tracking.
Figure 20:
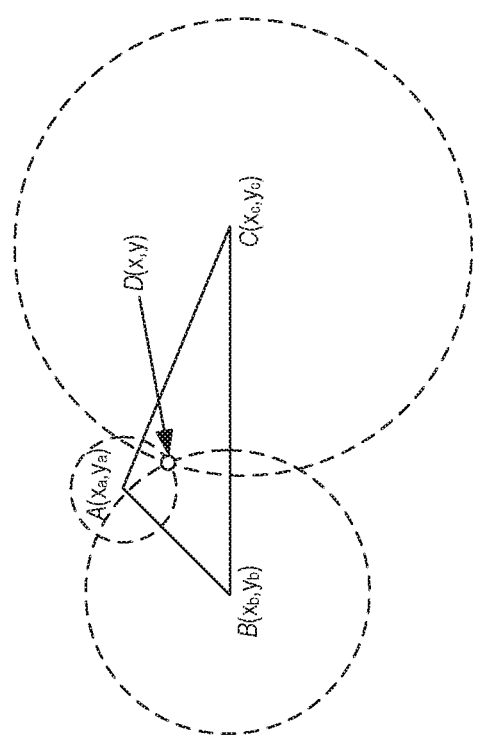
FIG. 20 shows a triangulation concept using WiFi or BLE (Bluetooth low energy).

The system can use various types of measurement for tracking purposes, such as Time of Arrival (TOA), Time Difference of Arrival (TDOA), Angle of Arrival (AOA), and Received Signal Strength (RSS). Instead of TOA, round-trip time (RTT) may be used to avoid the need for synchronization. LOS may not be available—the system can use a linear regression with a mean square error as the model which best relates the statistical estimator of the RTT to the actual distance between two wireless units in LOS or NLOS. The statistical estimator that best fits that model is found with the aim of improving the accuracy achieved in distance estimates. Moreover, hybrid location techniques such as TDOA and AOA, TOA and RSS or DOA and RSS can be exploited to improve accuracy. FIG. 19 shows time of arrival and amplitude measurements for tracking. FIG. 20 shows a triangulation concept using WiFi or BLE.

Figure 21:
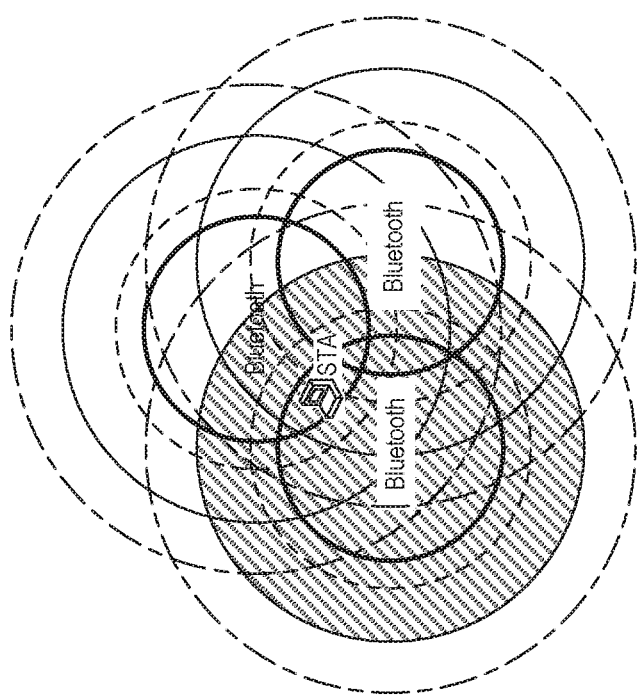
FIG. 21 shows a client within ranges of multiple Bluetooth while units of the system only communicate over WiFi.

The system can also use Bluetooth for proximity estimation. For example, if a low power Bluetooth device is intended to be tracked, the system can identify a unit closest to the Bluetooth device even if it is reachable from only one of the devices. A Bluetooth GATT profile may be used for proximity detection. Propagation time of electromagnetic waves may be used on Bluetooth to do the relative location measurement to a unit of the system if Bluetooth can be heard from multiple devices. Relative position of units of the system in the house and the house plot may be entered by the user, and then the positions are shown on top of the house plot to the user. The position can be shown on a web page or phone app. FIG. 21 shows client within ranges of multiple Bluetooth devices, while units of the system may only communicate over WiFi.

Figure 22:
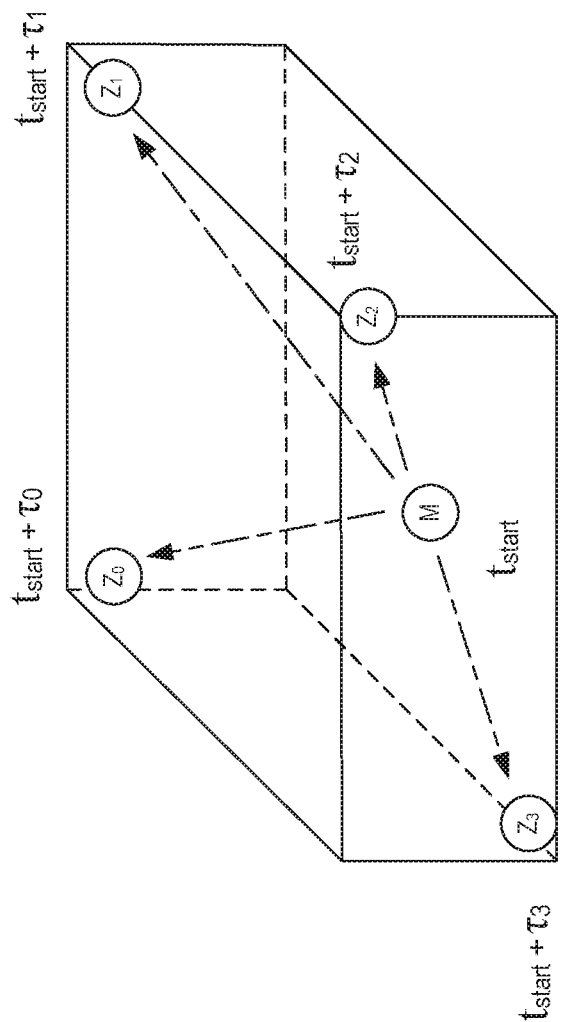
FIG. 22 shows a Bluetooth localization using time of arrival.

The system can conduct Bluetooth localization using time of arrival. FIG. 22 shows a Bluetooth localization using time of arrival. Synchronization between base station and satellite units may be performed in order to measure relative delay. Dedicated hardware for phase measurement can be installed on Bluetooth device or on units of the system.

The system can use backhaul for coordination and time measurement. In other words, the management of time synchronization of Bluetooth may be performed over a dedicated backhaul. The amplitude may also be used for measurement. All information will be communicate to one or more of the units, and relative location will be calculated and communicated to the user.

The system can also use WiFi localization. A trigger frame may be sent from AP to client. The client may measure relative delay from all APs. A trigger frame may be sent from AP to client, and the client may send another frame back to the AP to calculate RTT. The trigger frame may be sent from client to AP as well. Relative delay or RTT can be measured from the client side as well.

Figure 23:
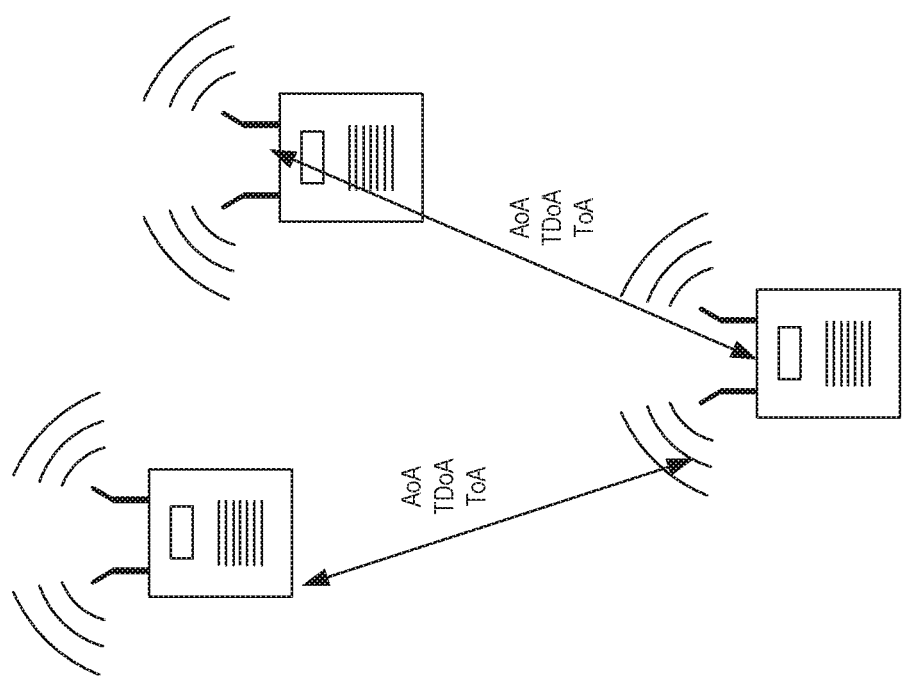
FIG. 23 shows that location of one unit of the system can be detected from known locations of other units of the system.

FIG. 23 shows that the location of one unit of the system can be detected from known locations of other units of the system.

Figure 24:
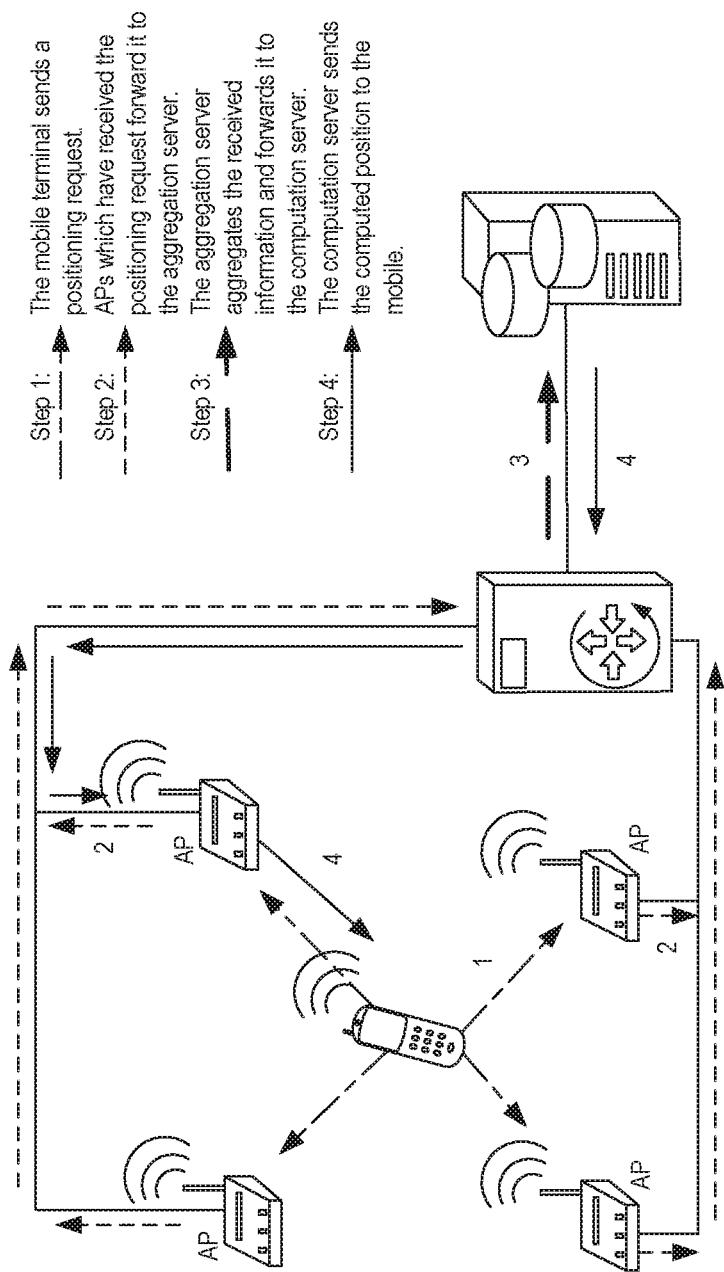
FIG. 24 shows a device used for locating itself.

The system can use a device to locate itself. The management of time synchronization of Bluetooth may be performed over a dedicated backhaul. The data aggregation may be done on base unit. Communication can be done on a unit of the system or a cloud server which the unit is communicating with. FIG. 24 shows a device used for locating itself.

An AP (unit) or a cloud server can initiate the estimation. For example, an AP may trigger the location detection. The AP may send trigger frames to client, or it may ask client to send triggers to the AP. Alternatively, the cloud server may be used to initiate the location estimation. A phone app may be used to initiate the location estimation using Bluetooth or by using cloud connection.

The system can use different protocols for localization/tracking. There are various protocols for requests sent by an AP to a client to conduct a set of timing measurements with other access points. For example, 802.11k may be used as standardized RSSI measurements if RSSI is used for localization. 802.11u may be used as an address requirement for location awareness for E911. 802.11v provides formats for sending RSSI+geolocation (from GPS/aGPS) around the network.

Figure 25:
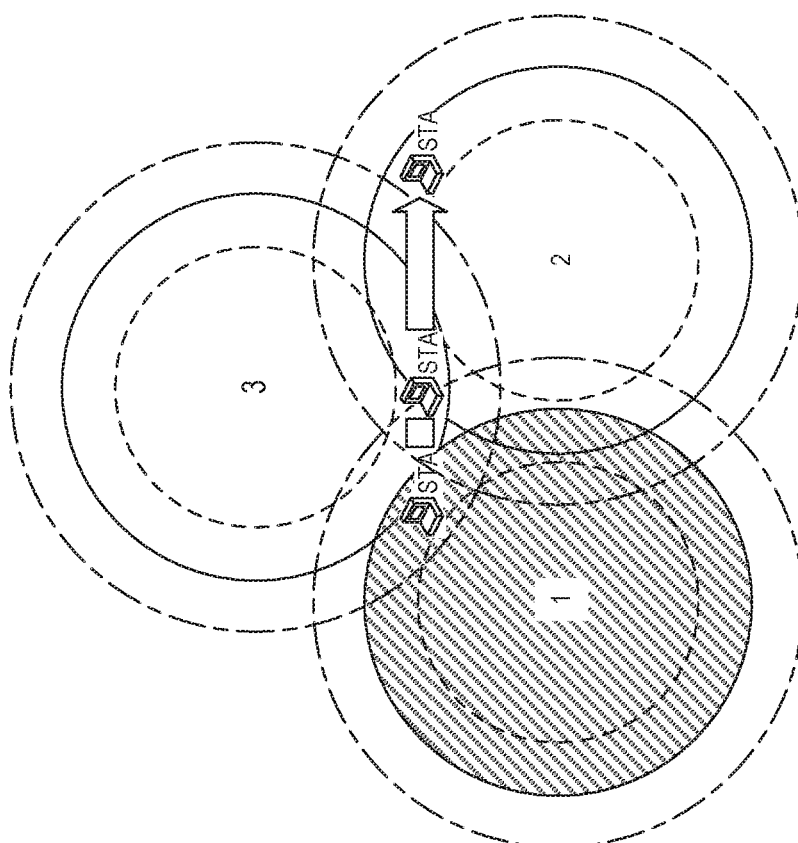
FIG. 25 shows that locations can be tracked based on initial GPS locations.

Fine Timing Measurement (FTM) protocol under IEEE 802.11 may also be used. For example, a client can request an AP to share its location (e.g. in latitude/longitude or as a civic address). The AP can share information about their "height," e.g. floor number or "height above floor" with client devices. The AP can additionally share a set of AP locations in the form of a "neighbor report," which can significantly enhance the efficiency of the data exchange. The AP can also send a request to a client to conduct a set of timing measurements with other access points. AP can send a request to ask a client to report its location. A client can send a request to ask an AP to share a URI or Domain Name where additional assistance or maps and mapping data can be obtained. A client and an AP can negotiate to schedule timing measurements at pre-arranged times and use timing measure to location estimation. Those measurements can be combined with GPS locations. FIG. 25 shows that locations can be tracked based on initial GPS locations.

In some other embodiments, the system can also track locations based on IP addresses or known SSID (Service Set Identifier).

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A method comprising:
    connecting, by a first access point, a mobile device to a small cell local area network via wireless communication wherein the first access point is one of a plurality of access points communicatively coupled in the small cell local area network, wherein the first access point is an initial connection point between the mobile device and the small cell local area network;
    maintaining a device history, by the plurality of access points, of the mobile device, the device history including recorded locations where the mobile device was previously stopped at for at least a threshold period of time;

upon establishing said connection, predicting an endpoint of a first movement of the mobile device based on a predetermined degree of similarity between measured features of the first movement and a past movement of the mobile device, wherein the endpoint is a location that the mobile device ceased motion at an end of the past movement;

determining a second access point of the plurality of access points in the small cell local area network based on the device history and an identification of an access point of the plurality of access points that has a historical strength of signal to the mobile device at the endpoint that is greater or equal to every other access point of the plurality of access points; and roaming wireless communication of the mobile device, by the first access point, to the second access point of the plurality of access points regardless of a current position of the mobile device.

2. The method of claim 1, wherein the past movement of the mobile device intersects a wireless communication range of the second access point.

3. The method of claim 1, wherein the endpoint of the is where wireless device signal strength with the second access point is greater or equal to every other access point of the plurality of access points.

4. The method of claim 1, wherein the first movement includes a first starting point, said predicting further based on the past movement of the mobile device having a previous starting point similar to the first starting point.

5. The method of claim 1, wherein the first movement includes a first vector, that first vector having a first direction, and the first direction points toward the second access point.

6. A system of a plurality of wireless access points forming a small cell network comprising:

network backhaul radios in each of the plurality of wireless access points that enable wireless coordination between each of the wireless access points within the small cell network, the wireless access points configured to detect movement of a mobile device relative to each of the wireless access points;

a first access point of the plurality of wireless access points, the first wireless access point configured to perform an initial connection between the mobile device and the small cell network, connection to the small cell network enables connection to the Internet through for the mobile device;

a second access point of the plurality of wireless access points, the second wireless access point configured to connect the mobile device to the Internet through the small cell network with the mobile device;

a memory within at least one of the plurality of wireless access points configured to maintain a device history of the mobile device, the device history including recorded locations where the mobile device was previously stopped at for at least a threshold period of time; and a processor positioned within at least one of the plurality of wireless access points configured to roam the mobile device from the first access point to the second access point regardless of a current position of the mobile device, the second access point is identified from the plurality of access points based on the device history and an identification of an access point of the plurality of access points that has a higher historical strength of signal to the mobile device at a predicted endpoint of a first movement of the mobile device determined by a predetermined degree of similarity between measured features of the first movement and a past movement of the mobile device, wherein the predicted endpoint is a location that the mobile device ceased motion at an end of the past movement, the second access point has a historical strength of signal to the mobile device at the endpoint that is greater or equal to every other access point of the plurality of access points.

7. The system of claim 6, wherein the past movement of the mobile device intersects a wireless communication range of the second access point.

8. The system of claim 6, wherein the processor is further configured to detect a first starting point of the first movement, and predict the endpoint based further on the past movement of the mobile device having a past starting point similar to the first starting point.

9. The system of claim 8, wherein the first movement includes a first direction, and the first direction points toward the second access point.

10. The system of claim 6, further comprising:

A memory communicatively coupled with the processor and configured to maintain a device history of the mobile device, the device history includes recorded locations where the mobile device was previously stopped at for at least a threshold period of time.

11. The system of claim 10, wherein the processor identifies the second access point further based on the device history and wherein the recorded locations are at least partially at a given location at which wireless device signal strength with the second access point is greater or equal to every other access point of the plurality of access points.

12. A method comprising:

connecting, by a first access point, a mobile device to a small cell local area network via wireless communication wherein the first access point is one of a plurality of access points communicatively coupled in the small cell local area network, wherein the first access point is an initial connection point between the mobile device and the small cell local area network;

maintaining a device history, by the plurality of access points, of the mobile device, the device history including recorded locations where the mobile device was previously stopped at for at least a threshold period of time;

predicting, by the plurality of access points, an endpoint of a first movement of the mobile device based on a predetermined degree of similarity between measured features of the first movement and a past movement of the mobile device, wherein the endpoint is a location that the mobile device ceased motion at an end of the past movement;

determining a second access point of the plurality of access points in the small cell local area network based on the device history and an identification of an access point of the plurality of access points that has a historical strength of signal to the mobile device at the endpoint that is greater or equal to every other access point of the plurality of access points;

dropping connection, by the first access point, with the mobile devices; and communicating, by the second access point only, with the mobile device wherein each of other access points of the plurality of access points maintains a blacklist including the mobile device.

13. The method of claim 12, wherein the past movement of the mobile device intersects a wireless communication range of the second access point.

14. The method of claim 13, wherein the endpoint is within the wireless communication range of the second access point.

15. The method of claim 14, wherein the endpoint of the past movement is a given location at which wireless device signal strength with the second access point is greater or equal to every other access point of the plurality of access points.

* * * * *